US011257046B1

(12) United States Patent
Goetz et al.

(10) Patent No.: US 11,257,046 B1
(45) Date of Patent: Feb. 22, 2022

(54) SYSTEMS AND METHODS TO TRACK AND AUTOMATE HOME MANAGEMENT

(71) Applicant: HomeManager Corporation, Livingston, MT (US)

(72) Inventors: Manfred Goetz, Livingston, MT (US); Kelly Hatfield, Livingston, MT (US)

(73) Assignee: HOMEMANAGER CORPORATION, Livingston, MT (US)

( * ) Notice: Subject to any disclaimer, the term of this patent is extended or adjusted under 35 U.S.C. 154(b) by 0 days.

(21) Appl. No.: 17/165,761

(22) Filed: Feb. 2, 2021

(51) Int. Cl.
| | |
|---|---|
| *G06Q 10/10* | (2012.01) |
| *G06Q 10/06* | (2012.01) |
| *G06Q 30/02* | (2012.01) |
| *G06Q 30/06* | (2012.01) |
| *G06Q 10/00* | (2012.01) |
| *G06F 16/2457* | (2019.01) |
| *G06F 16/27* | (2019.01) |
| *G06Q 50/16* | (2012.01) |
| *G06Q 40/08* | (2012.01) |
| *G06Q 50/26* | (2012.01) |
| *G06K 9/00* | (2022.01) |

(52) U.S. Cl.
CPC ....... *G06Q 10/20* (2013.01); *G06F 16/24578* (2019.01); *G06F 16/27* (2019.01); *G06Q 30/0201* (2013.01); *G06Q 40/08* (2013.01); *G06Q 50/163* (2013.01); *G06Q 50/26* (2013.01); *G06K 9/00711* (2013.01); *G06Q 30/0278* (2013.01)

(58) Field of Classification Search
CPC .... G06Q 10/20; G06Q 50/26; G06Q 30/0278; G06Q 30/0201; G06Q 40/08; G06Q 50/163; G06F 16/27; G06F 16/24578; G06K 9/00711
USPC .................................................. 705/1.1–912
See application file for complete search history.

(56) References Cited

U.S. PATENT DOCUMENTS

| | | | | |
|---|---|---|---|---|
| 5,680,305 | A  * | 10/1997 | Apgar, IV | .......... G06Q 10/0635 |
| | | | | 705/7.28 |
| 10,489,813 | B1 * | 11/2019 | De Guia | ................ G06Q 10/20 |
| 2007/0067180 | A1 * | 3/2007 | James | ................... G06Q 50/16 |
| | | | | 705/306 |

(Continued)

*Primary Examiner* — Jonathan P Ouellette
(74) *Attorney, Agent, or Firm* — Nolte Lackenbach Siegel

(57) ABSTRACT

Home management tasks may be tracked, scheduled, verified, and accounted for using computer systems interacting with each other to maintain an overall "HomeScore" for a given property. The HomeScore represents an indication of compliance with overall quality of maintenance tasks for a specific residential property. Compliance may be required by local ordinances and building codes. Insurance companies may desire insight into upkeep (e.g., overall maintenance) of the property for which they are providing "homeowners insurance." Disclosed systems may interact with a) government computer systems (e.g., building code enforcement, property tax authorities, etc.); b) real estate agent computer systems (e.g., systems that promote buying and selling of real estate); and c) vendor computer systems (e.g., service providers and do it yourself (DIY) retailers). This interaction, along with homeowner input of data, may be used to produce an individualized HomeScore representing one validated (i.e., not subjective) indication of "quality" of a property.

17 Claims, 17 Drawing Sheets

(56) References Cited

U.S. PATENT DOCUMENTS

| | | | | |
|---|---|---|---|---|
| 2008/0255862 A1* | 10/2008 | Bailey | ............... | G06Q 40/06 |
| | | | | 705/1.1 |
| 2008/0301064 A1* | 12/2008 | Burns | ............... | G06Q 50/16 |
| | | | | 705/400 |
| 2014/0142989 A1* | 5/2014 | Grosso | ............... | G06Q 40/00 |
| | | | | 705/4 |
| 2014/0172479 A1* | 6/2014 | Gallagher | ...... | G06Q 10/063114 |
| | | | | 705/7.15 |
| 2015/0120349 A1* | 4/2015 | Weiss | ............ | G06Q 10/06311 |
| | | | | 705/7.13 |
| 2015/0302488 A1* | 10/2015 | Wilson | ............ | G06Q 30/02 |
| | | | | 705/306 |
| 2016/0048934 A1* | 2/2016 | Gross | ............... | G06K 9/4642 |
| | | | | 705/313 |
| 2016/0148285 A1* | 5/2016 | Kalata | ............ | G06Q 30/0278 |
| | | | | 705/306 |
| 2019/0279002 A1* | 9/2019 | Boyle | ............... | G06F 16/29 |
| 2020/0342421 A1* | 10/2020 | Ramer | ............... | G06Q 50/10 |

\* cited by examiner

SYSTEMS AND METHODS TO TRACK AND AUTOMATE HOME MANAGEMENT

BACKGROUND

Maintenance of a residential property is an ongoing activity that each homeowner undertakes with virtually no outside guidance or supervision. Maintenance tasks may include minor updates such as gutter maintenance or may include more significant tasks such as replacing a roof, water heater, air conditioner system, etc. Some maintenance tasks should be performed periodically, while other tasks may only be performed as needed.

Asset management systems and building management systems may track maintenance activities and may be available for commercial buildings and corporations. However, there is a need for a digital system to assist individual homeowners with tracking and validation of individual maintenance activities. This disclosure provides an integrated, cloud-based, computer application to address such needs while keeping the data free from fire, water or misplacement.

BRIEF DESCRIPTION OF THE DRAWINGS

For a detailed understanding of various examples, accompanying drawings are provided. The following figures form part of the present specification and are included to further demonstrate certain aspects of the present claimed subject matter. These figures are examples that are not necessarily drawn to scale and should not be used to limit or restrict the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings. Additionally, like reference numerals in the drawings identify identical or substantially similar elements, wherein:

DETAILED DESCRIPTION

Figure 1:
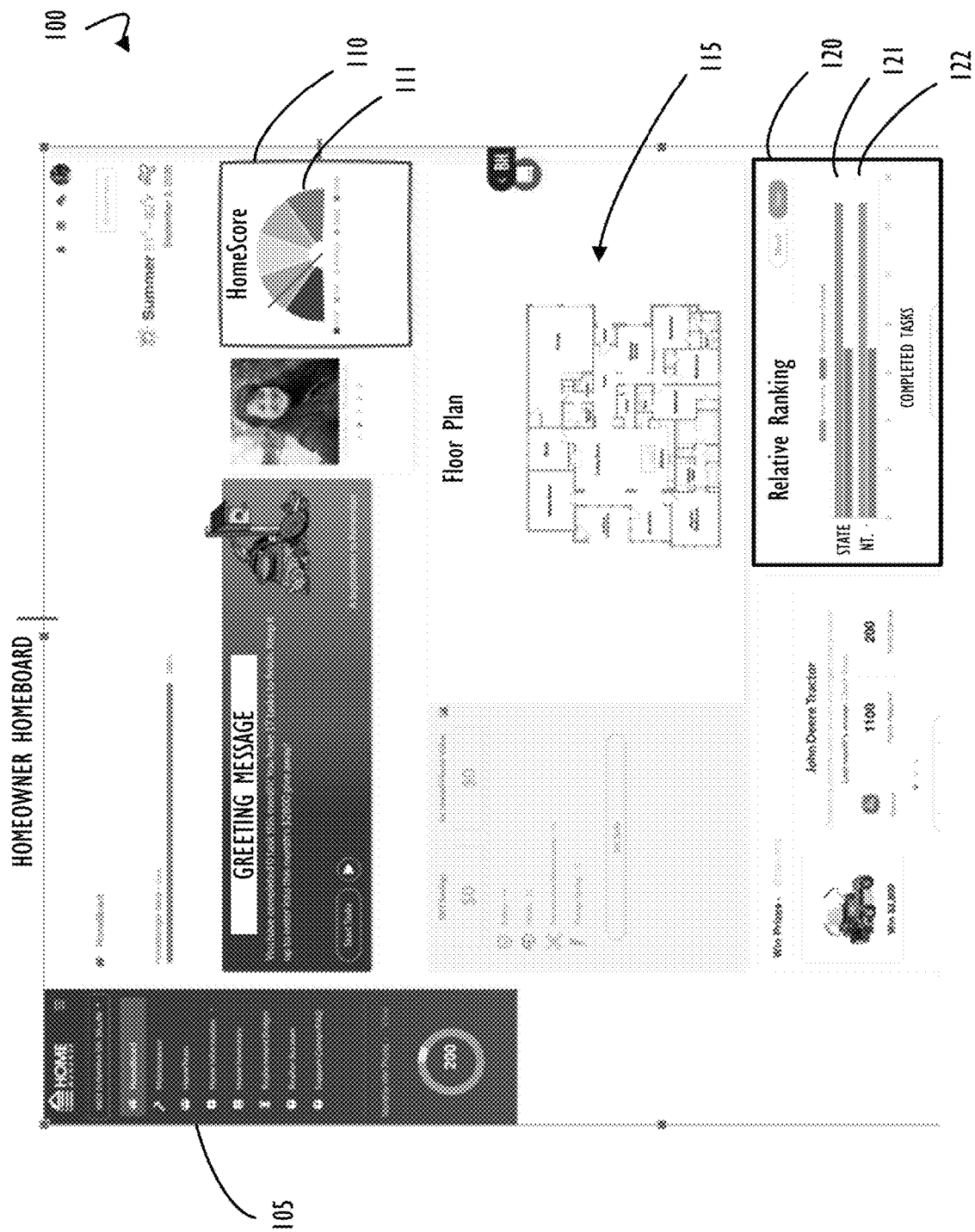
FIG. 1 is an example of a screen shot for a homeowner HomeBoard, according to one or more examples of the disclosure.

Certain terms are used throughout the following description and claims to refer to particular components, configurations of components, and functions provided by people/service providers/computers/networks. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form to avoid obscuring the disclosed embodiments. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The scope of the protection sought herein is defined by the appended claims and equivalents thereof. Illustrative embodiments are described below. In the interest of clarity, not all features of an actual implementation are described in every embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. As understood by those skilled in the art, elements in flow charts may be performed in the order shown or may be performed in an order different than shown to achieve the same or a similar result.

This disclosure provides for a system to support residential property owners. The system should support real estate agents, individual homeowners, property managers (e.g., managers of multiple rental properties), and other classifications of ownership. The system should provide an objective value to what has historically been a subjective determination of a "quality" of a residential property. Challenges facing homeowners are different than those affecting owners of commercial properties. For example, values of commercial properties are not determined using the same subjective standards that may be used when appraising and assessing values of residential properties.

This disclosure provides for a system that addresses the above-referenced needs and more by integrating with:
  governmental systems (e.g., taxing authorities and building regulators);
  systems assisting with buying and selling of real estate (e.g., multiple listing services (MLS), Zillow®, Redfin®, etc.);
  systems of homeowner's insurance providers;
  systems from home improvement/Hardware stores (e.g., Home Depot®, Lowes®, etc.); and
  information obtained relative to other similarly situated residences.

The disclosed system integrates with governmental systems (e.g., taxing authorities and building regulators), systems assisting with buying and selling of real estate (e.g., multiple listing services (MLS), internet listing databases, Zillow®, Redfin®, etc.), systems of homeowner's insurance providers, systems from home improvement/hardware stores (e.g., Home Depot®, Loews®, etc.), and information obtained relative to other similarly situated residences. Using information from the above integrations, the disclosed systems maintain information about specific residential properties and provide objective insight into a maintenance history for a target property. The maintenance history may result in a better maintained property having a higher "HomeScore" than a lesser maintained (or even neglected) property.

The disclosed system uses data mining techniques to extract and correlate information from a plurality of similarly situated residential properties. The datamining can be performed using real-time data, near real-time collection, historical archival methods, or a combination thereof. Using data analysis techniques as applied to the correlated data, objective metrics may be determined for what have previously been purely subjective measurements.

Today's purchaser of a home usually relies on a real estate agent or home inspection to determine the condition of a house. The home inspector typically spends a few hours to manually assess the condition of a given residence. This assessment may depend greatly upon subjective factors intentionally or unintentionally biased by the manual inspection. Factors that may affect the assessment include the skill and experience of the inspector and how well a homeowner has "prepped" a property for sale. Specifically, some homeowners may cover up defects in a home when it is being prepped for sale.

This cover up may be, for example, a cosmetic repair to a structural problem, or cleaning of a very old unit (e.g., air conditioner, water heater) to make that very old unit appear to be in better condition than it really is. Other factors, including personal bias, favoritism, payoffs, may also have an impact in the results of a home inspection.

Residential property appraisers, taxing authorities, and real estate agents may use a "comparison" approach to determine a market value. In a comparison approach to market value, attributes of a property are compared with corresponding attributes of "comparable" properties that have recently been subject to a transaction (purchase/sale). Attributes include, but are not limited to, square footage, number of rooms, number of bedrooms, amenities such as a pool, and school zoning. An important aspect that is generally not available to an appraiser (or potential buyer) is an indicator of how well a subject property (the one being appraised or considered for purchase) and other properties (the above mentioned comparable properties) have been maintained.

A well maintained property should/will have a higher value than a poorly maintained property. A buyer of a poorly maintained property should expect more cost as a result of previous neglect. An owner of a rental property may incur more expense if a tenant fails to properly maintain the rented property. Disclosed systems and techniques attempt to capture non-subjective metrics to provide a HomeScore that may enhance the ability of appraisers or home buyers to properly assign an objectively "correct" value to a subject property.

The disclosed system provides multiple interface points for interaction with the overall system from different perspectives. One interface point is from the perspective of a homeowner or residential property manager trying to maintain one or more residential properties. A second interface point is from the perspective of a real estate agent attempting to maintain professional and personal relationships with clients (and potential clients). A third interface point is from the perspective of a potential home buyer. The potential home buyer may desire to understand how well a prospective property that they are considering for purchase may have been cared for over time. A fourth interface point is from the perspective of a home insurance provider because maintenance of a residence may affect insurance premium calculations. Other interface points (e.g., taxing authority, homeowner's associations, etc.) are also available and will be apparent from the overall discussion of this disclosure.

Turning now to the drawings, a description of the several screens presented in a HomeManager® cloud-based application will first be presented. (HomeManager is registered trademark of HomeManager Corp.) The screen shots provide interface points to the HomeManager cloud-based application for various users in various capacities. Examples include, but are not limited to, a homeowner, a real estate agent, a potential buyer, and still others. Access to parts of the HomeManager cloud-based application may be restricted to one or more classes of users or granted upon certain conditions as discussed further below.

The screenshots discussed below are representative examples and are not exhaustive. For instance, screenshots of interface points for a homeowner, or potential buyer, or real estate agent are shown but not for insurance appraisers, tax appraisers, or bank appraisers. Those skilled in the art having the benefit of the disclosed screenshots will be able to extrapolate from those screenshots shown herein to develop interface points for other users in other capacities.

Referring now to FIG. 1, an example screen shot 100 of a homeowner "HomeBoard" from a HomeManager cloud-based application is depicted, according to one or more examples of this disclosure. The HomeBoard is an interface point for the homeowner. The HomeBoard represents a "dashboard" style view (from the above-mentioned homeowner perspective) into information maintained by the disclosed HomeManager cloud-based application.

In screen shot 100, there is a navigation pane 105 to allow a homeowner to navigate to different views of information maintained in the HomeManager cloud that is discussed further below. At the screen area 110 there is a HomeScore 111 that is depicted as a radial dial in this example. As mentioned above, and discussed in more detail below, the HomeScore represents a relative "scaled" ranking for a subject property as a reflection of the "relative quality" of maintenance (upkeep) that has been performed for that subject property (e.g., by interactive homeowner users).

The relative attribute is determined based on a correlation with other similarly situated properties (e.g., geographic location, price range, etc.). As indicated at screen area 120, two rankings with respect to completed maintenance tasks are shown. A state-wide relative ranking 121 is illustrated above a nation-wide relative ranking 122. In this example, each of these rankings (state-wide relative ranking 121 and nation-wide relative ranking 122) are shown as a respective pair of bar graphs, that provide an indication of how the subject property ranks relative to the average for either the state or the nation. Note that the presentation of the state-wide relative ranking 121 and the nation-wide relative ranking 122 is implementation specific and, in other examples, may be presented in other graphical or textual ways. Additionally, an expanded annual review screen (not shown) may be provided.

A floorplan 115 is shown for the subject property. As explained in more detail below, this floorplan may be manually uploaded or automatically generated with the HomeManager app. The automatic generation of a floorplan may optionally include a home inventory generation process. Each of these automatic generation processes are discussed in more detail below with reference to FIG. 11. In general, the HomeBoard shown in screen shot 100 allows for an "at a glance" view to allow a homeowner to manage their property and selectively share with others.

Figure 2:
FIG. 2 is an example of a screen shot for a real estate agent dashboard, according to one or more examples of this disclosure.

Referring now to FIG. 2, screen shot 200 illustrates one example of a real estate agent dashboard as may be provided using information from the disclosed HomeManager cloud-based application. The screen shot 200 provides a real estate agent interface point first mentioned above. Screen shot 200 illustrates a view, from the real estate agent perspective, to information maintained in the HomeManager cloud discussed further below. This dashboard view includes navigation pane 201 (similar to navigation pane 105 discussed above for FIG. 1) that allows a real estate agent to navigate to different areas of information when interacting with the HomeManager cloud-based application.

Screen area 205 illustrates information pertaining to different clients of the currently logged in real estate agent. Screen area 210 provides information about active clients. The active clients represent clients of this real estate agent that have an active interaction capability (i.e., have a current subscription for) the HomeManager cloud-based application. Screen area 215 illustrates a set of "pending client sponsor" records. Each of the pending client sponsor records represents a client (or potential client) of the real estate agent that may be provided a sponsored account (e.g., pre-paid for a period of time) to allow them access to the disclosed HomeManager cloud-based application. It is envisioned that real estate agents may invite/sponsor individuals as an incentive to those individuals as clients or potential clients to receive a membership or premium membership.

Figure 3:
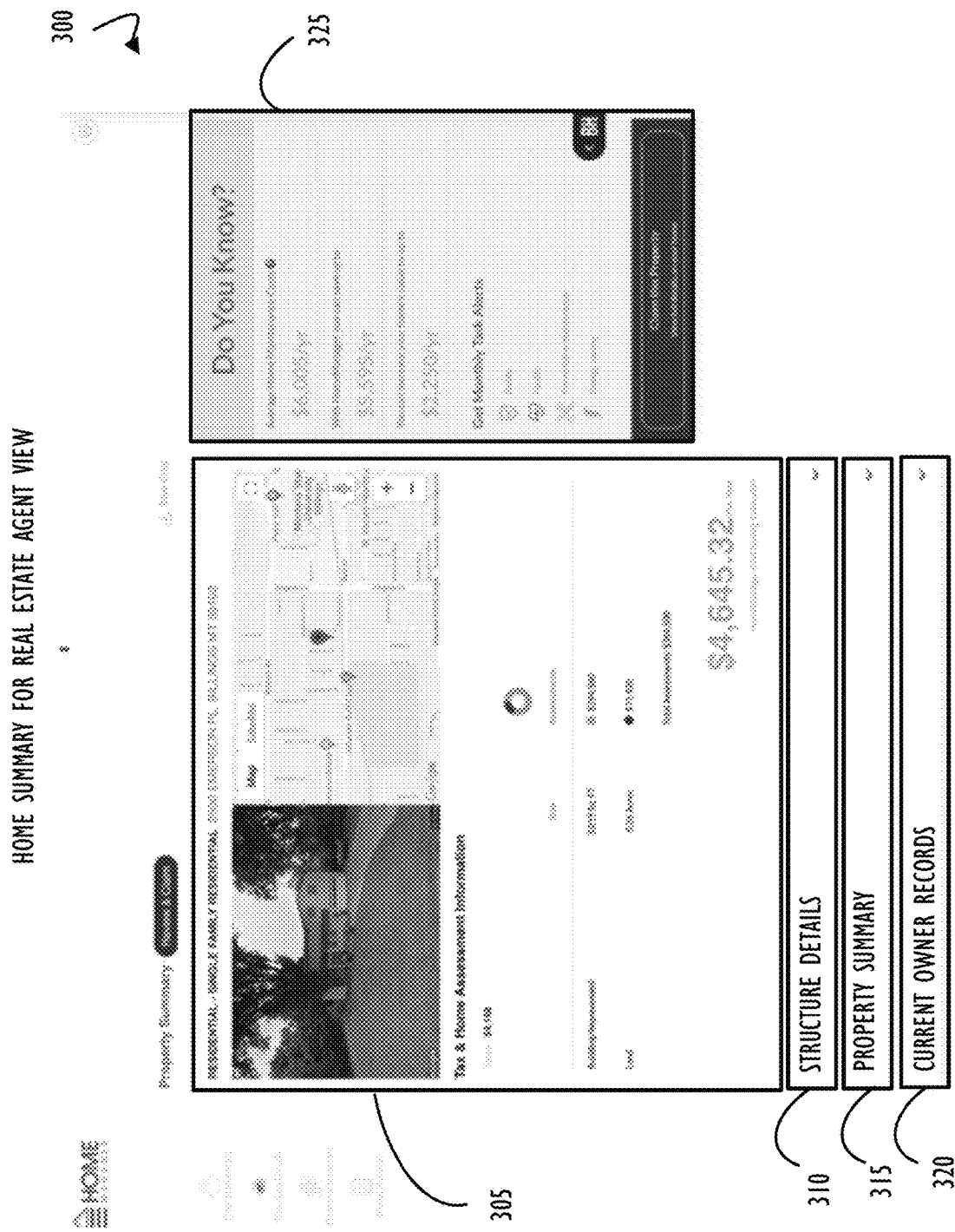
FIG. 3 is an example of a screen shot for a home summary for real estate agent/Members, according to one or more examples of this disclosure.

Referring now to FIG. 3, screen shot 300 of the disclosed HomeManager cloud-based application illustrates a home summary view that may be beneficial to a real estate agent (or prospective buyer). This type of home summary view may be useful to an agent preparing to list a house for sale (i.e., a listing agent) and/or may be useful to an agent or buyer that is intending to purchase a particular property. Screen area 305 includes information that may be available on any generally available real estate listing site and the information provides an overview of the subject property. The structure details 310, property summary 315, current owner records 320, and "do you know?" area 325 provide information that may not be available to non-members to notify them via a general purpose marketing capture of this real estate marketing site.

With proper access permissions, a user (e.g., real estate agent or sponsored potential home buyer) may be able to access information maintained in the HomeManager cloud-based application for the subject property. Specifically, the information maintained under each of the dropdown dialogs may include information provided by the homeowner that is not available to the general public. Even though this information is not desired to be generally available to the public, a homeowner wishing to sell the subject property may allow selected access (e.g., via allowing access to information within the HomeManager cloud) to professionals or prospective buyers to assist in the sale of that property.

Figure 4:
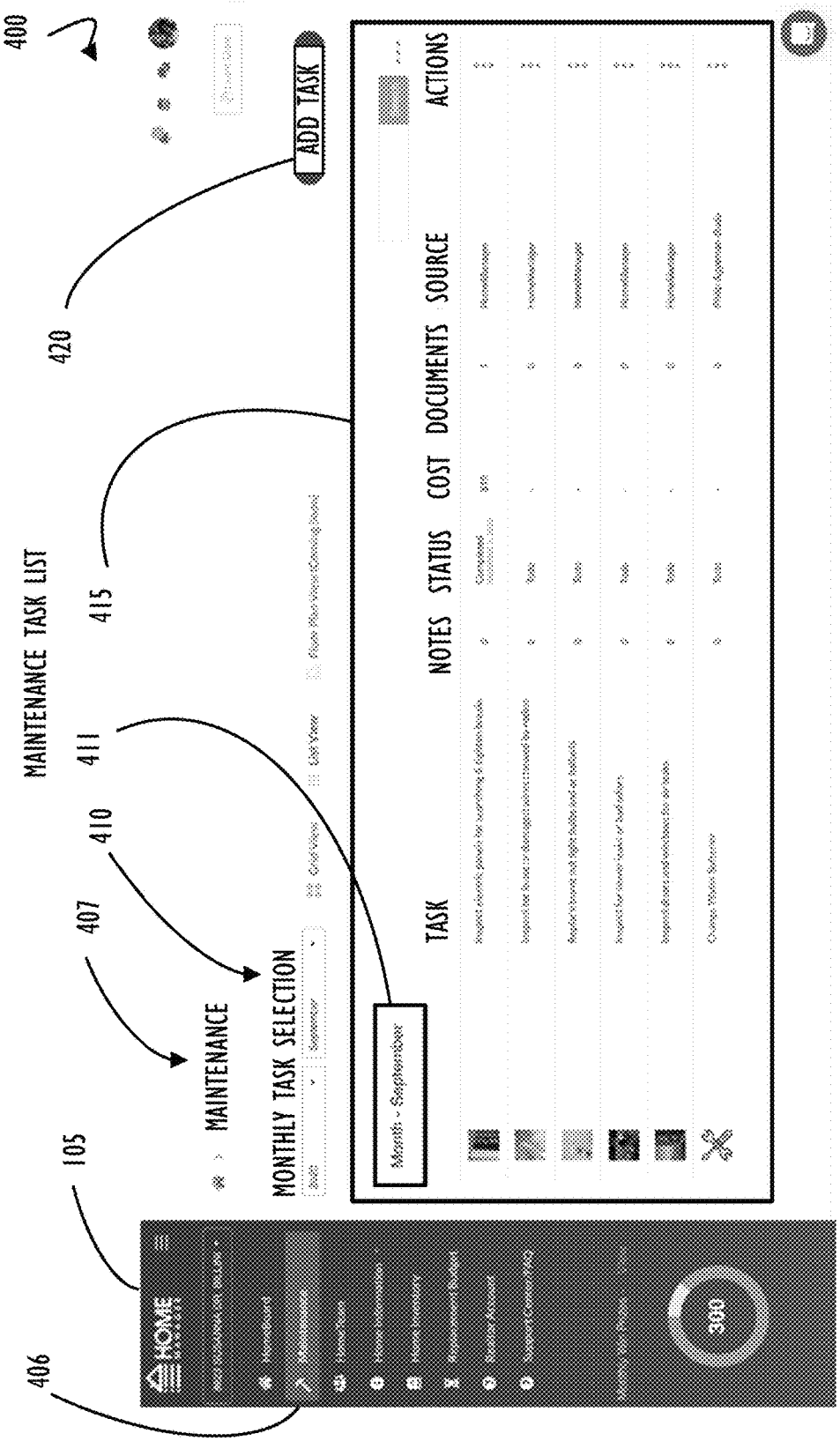
FIG. 4 is an example of a screen shot for a maintenance task list management interface for use by a homeowner or property manager, according to one or more examples of this disclosure.

Referring now to FIG. 4, screen shot 400 illustrates from a homeowner perspective a maintenance task list as one example of information maintained in the disclosed HomeManager cloud-based application. Navigation pane 105 is maintained in this view and the maintenance tab 406 has been selected as indicated by the title bar information 407. Monthly task selection 410 provides a pair of dropdown selection boxes that may allow a homeowner to select a date range for a list of maintenance tasks. In this example, screen area 411 indicates that the month of September has been selected. In some examples, both a month and a year may be selected. Screen area 415 includes a list view of task items associated with the currently selected homeowner property. For each of the tasks there is a line item that includes information about the task, notes for the task, status of the task, cost information for that task, associated documents for the task, a source for the task, and an actions selection area for the task. Add task button 420 allows a homeowner to add a maintenance task as appropriate. This interface may also allow homeowners to provide and print a complete detail to sales agents, future homeowners, and anyone in need of the information on what maintenance has been completed on the home.

The source of the task may be used to indicate if the homeowner added the task, the task was auto-generated by the HomeManager cloud-based application, or if another entity caused origination of the task. In one example, a homeowner's association (HOA) may generate a task for a subject property, or an insurance company may generate a task to maintain coverage or maintain a discount to existing coverage. Other examples of task generation are also possible. Once a generated task is associated with a subject property and given a time frame for completion, the homeowner may use the HomeManager cloud-based application as a task scheduler to prioritize, monitor completion status, and maintain records of completion for each task.

As discussed in more detail below (see FIG. 10), specific tasks may be subject to a certifiable validation criteria. This automated validation process may provide information to interested parties (e.g., insurance company, HOA, finance, etc.) to allow that interested party to have a high degree of confidence that the task has actually been completed for the subject property relative to a verifiable date.

Figure 5:
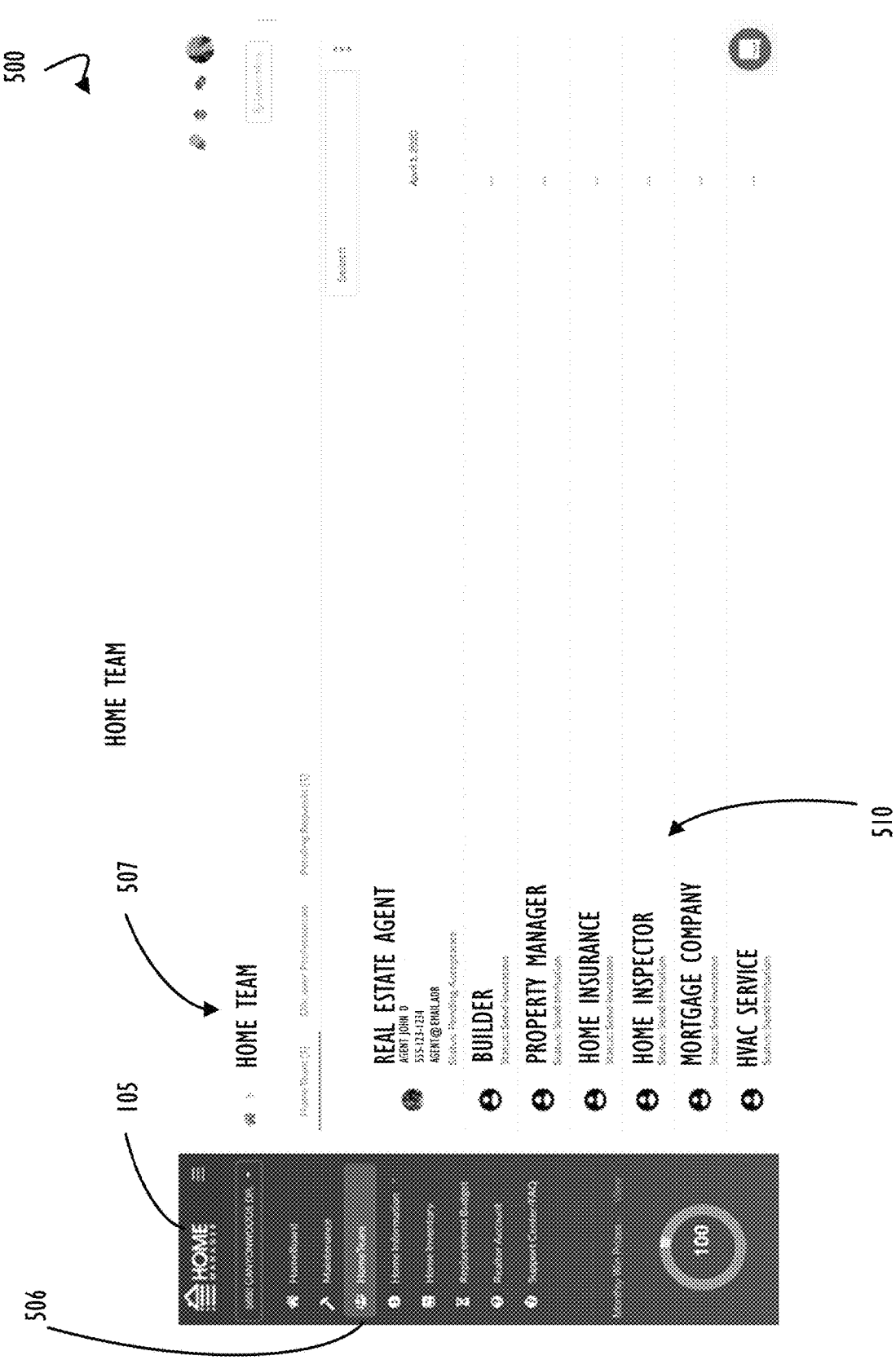
FIG. 5 is an example of a screen shot for a HomeTeam that includes contact information that may be useful over the maintenance lifecycle of a property, according to one or more examples of this disclosure.

Referring now to FIG. 5, screen shot 500 is an example of a HomeTeam that may be maintained by a homeowner to keep records of service providers or other contact information for professionals that have worked on a subject property. The HomeTeam page maintains navigation pane 105 and the HomeTeam tab 506 has been selected as indicated by the title bar information 507. Area 510 provides a list of different professionals that are organized based on areas of expertise relative to functions/services performed on the subject property. This information may be useful, for example, when a homeowner has an emergency and needs a service provider quickly or just needs to schedule the performance of a maintenance task that requires a professional or may be useful information when a homeowner is planning to sell their property.

Figure 6:
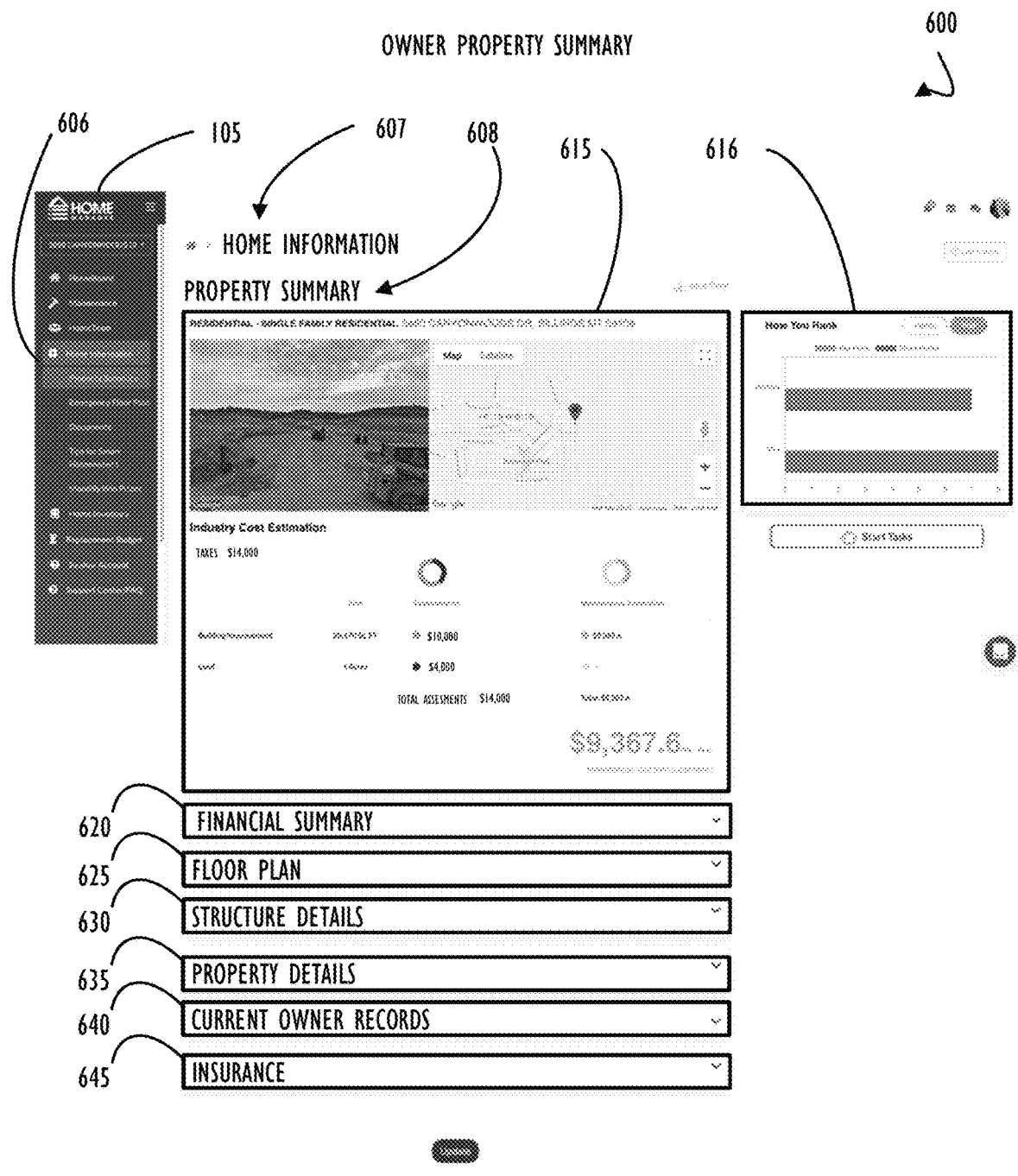
FIG. 6 is an example of a screen shot for an owner property summary, according to one or more examples of this disclosure.

Referring now to FIG. 6, screen shot 600 is an example of an owner property summary for use by a homeowner and providing a homeowner interface point. The owner property summary page maintains navigation pane 105 and the home information tab 606 has been selected as indicated by the title bar information 607. The sub-tab selection of property summary is indicated by sub-title bar 608. Screen area 615 provides overview information for a specific property that may be helpful to the homeowner. In screen area 616 a relative ranking indicator is provided. As discussed above, the relative ranking may provide an indication of how this particular property rates relative to similarly situated properties. Note that the relative rankings are presented in a different graphical form than they are in FIG. 1. In some examples, they may be presented using the same graphical presentation.

Screen shot 600 also illustrates several dropdown selection boxes a homeowner may use to view or update information within the cloud-based HomeManager application. Several example dropdown selection boxes are illustrated, and others are possible depending on the particular type of tracking information desired for a subject property.

In the example of screen shot 600, a dropdown for financial summary 620 allows access to financial information that a homeowner may privately maintain for their own budgeting or financial planning. A dropdown for emergency floor plain 625 allows access to view or update a floorplan for the subject property. A dropdown for structure details 630 allows access to view or update information about structural updates or changes to the subject property. A dropdown for property details 635 allows access to view or update miscellaneous property details such as those listed in the property summary overview. A dropdown for current owner records 640 allows access to view or update ownership records such as legal documents (e.g., deed, easements, etc.) or other formal documents related to the subject property (e.g., blueprints, warranties, etc.). A dropdown for insurance 645 allows access to view or update insurance documents related to the subject property (e.g., policy information, contact information, claim history, etc.).

Figure 7:
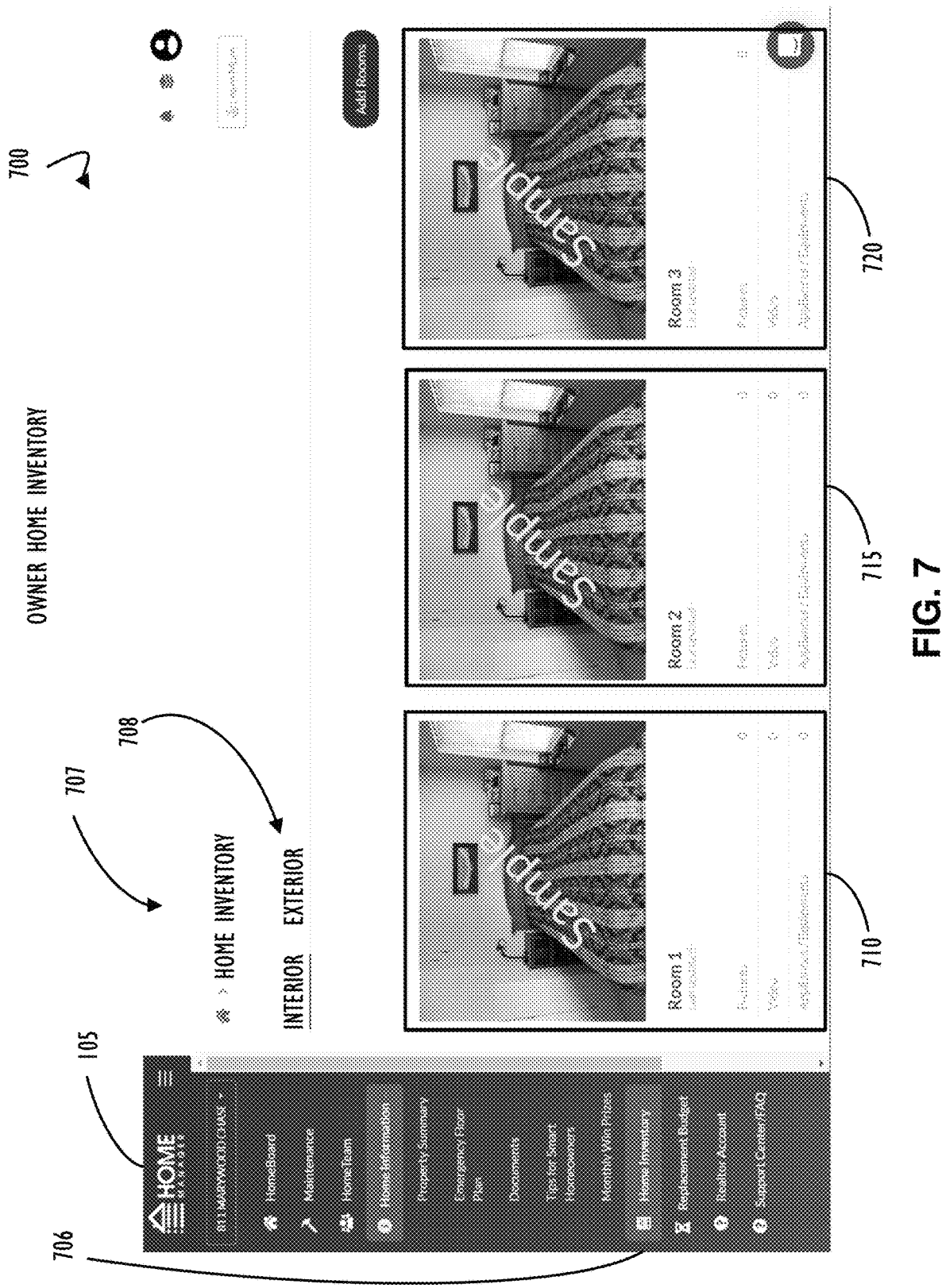
FIG. 7 is an example of a screen shot for a home inventory/assets that may be useful to interact with an insurance company after an unforeseen event (e.g., disaster), according to one or more examples of this disclosure.

Referring now to FIG. 7, screen shot 700 is an example of an owner's home inventory/assets for use by a homeowner and providing another interface point for the homeowner. This information may be available to homeowners to supply their insurance, finance company, or others based on a homeowner's intent. This information may provide a "validation point" to protect the homeowner on any disputed claims with an insurance company or a lender. The owner home inventory page maintains navigation pane 105 and the home inventory tab 706 has been selected as indicated by the title bar information 707. Two different inventory types 708 are provided with a first type representing an interior inventory and the second type representing an exterior inventory. In this example, interior inventory is sub divided into individual rooms (i.e., "room 1" 710, "room 2" 715, and "room 3" 720). One example process for populating a room inventory to list items associated with different rooms is discussed below as part of the floorplan generation function (See FIG. 11).

Figure 8:
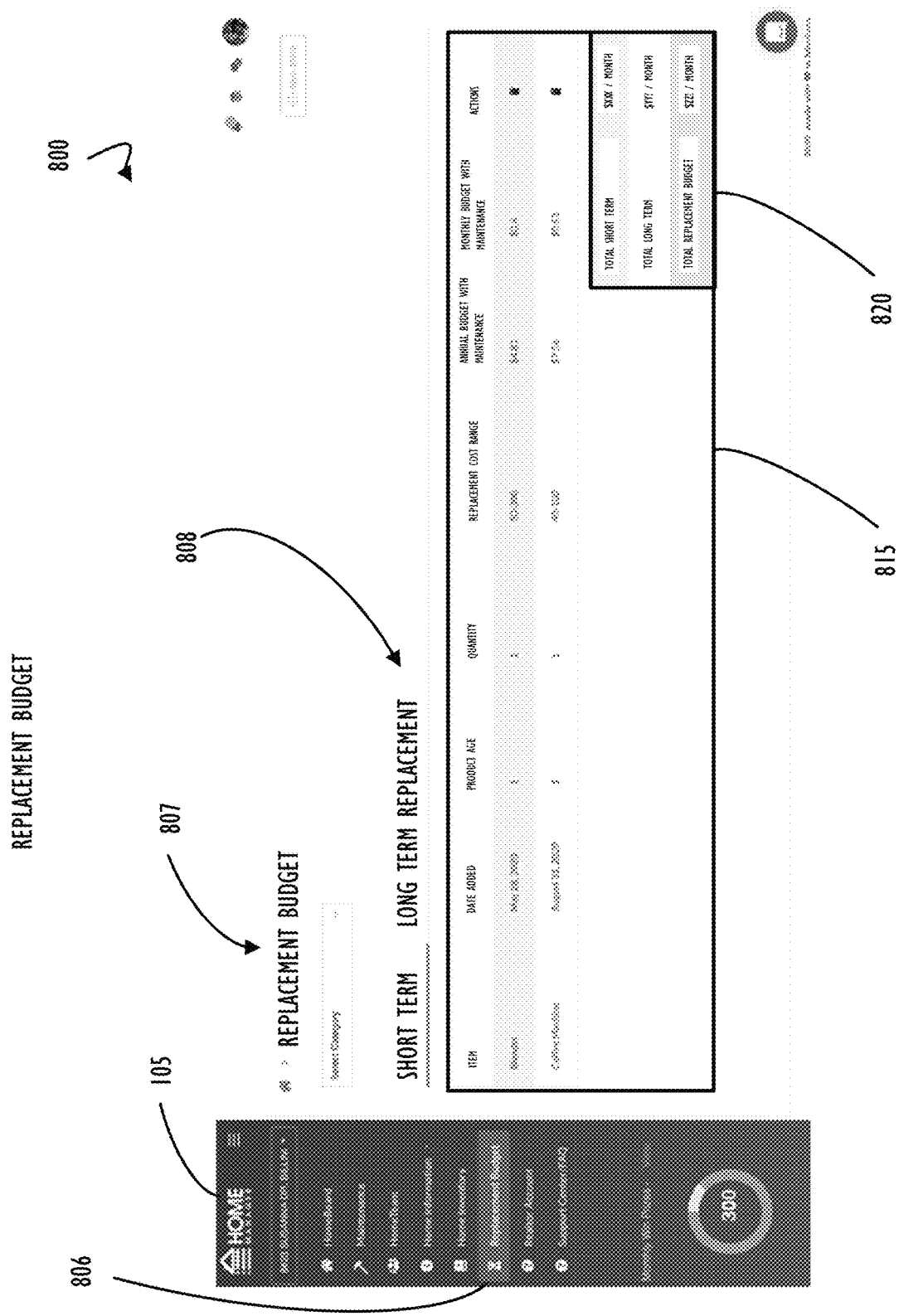
FIG. 8 is an example of a screen shot for a replacement budget that may be useful for a homeowner to plan and track maintenance, equipment, appliance, and replacement costs over time, according to one or more examples of this disclosure.

Referring now to FIG. 8, screen shot 800 is an example of a replacement budget planning view for use by a homeowner and providing yet another homeowner interface point. The replacement budget page maintains navigation pane 105 and the replacement budget tab 806 has been selected as indicated by the title bar information 807. Two different types of replacement 808 are provided. Homeowners, in this example, are provided with a first type "filter selection" representing a short term budgetary planning view and the second type representing a long term budgetary planning view. In this example, short term replacement budget items are illustrated in a list view provided in screen area 815. Screen area 820 provides a cumulative budgeting planning number as a total replacement budget. In this example, a per month cost is estimated to allow a homeowner to properly plan for both short term costs and to provide an indication of savings to accumulate for upcoming long term replacement budget items. The disclosed HomeManager cloud based application may include software that that provides real time budgets to homeowners. Via uploaded picture snapshots, the homeowner may be assisted in providing product age, description, and identifying/tracking recalls. Uploads of links to owner manual information may reduce the time a homeowner uses to gather and maintain this information manually. This type of information may be particularly useful to individuals who are first time homebuyers or owners who are living on a fixed income budget (e.g., retired or disabled people), in part, because significant cost items such as a new roof may require additional up-front planning with respect to budgeting or preventive maintenance.

Figure 9:
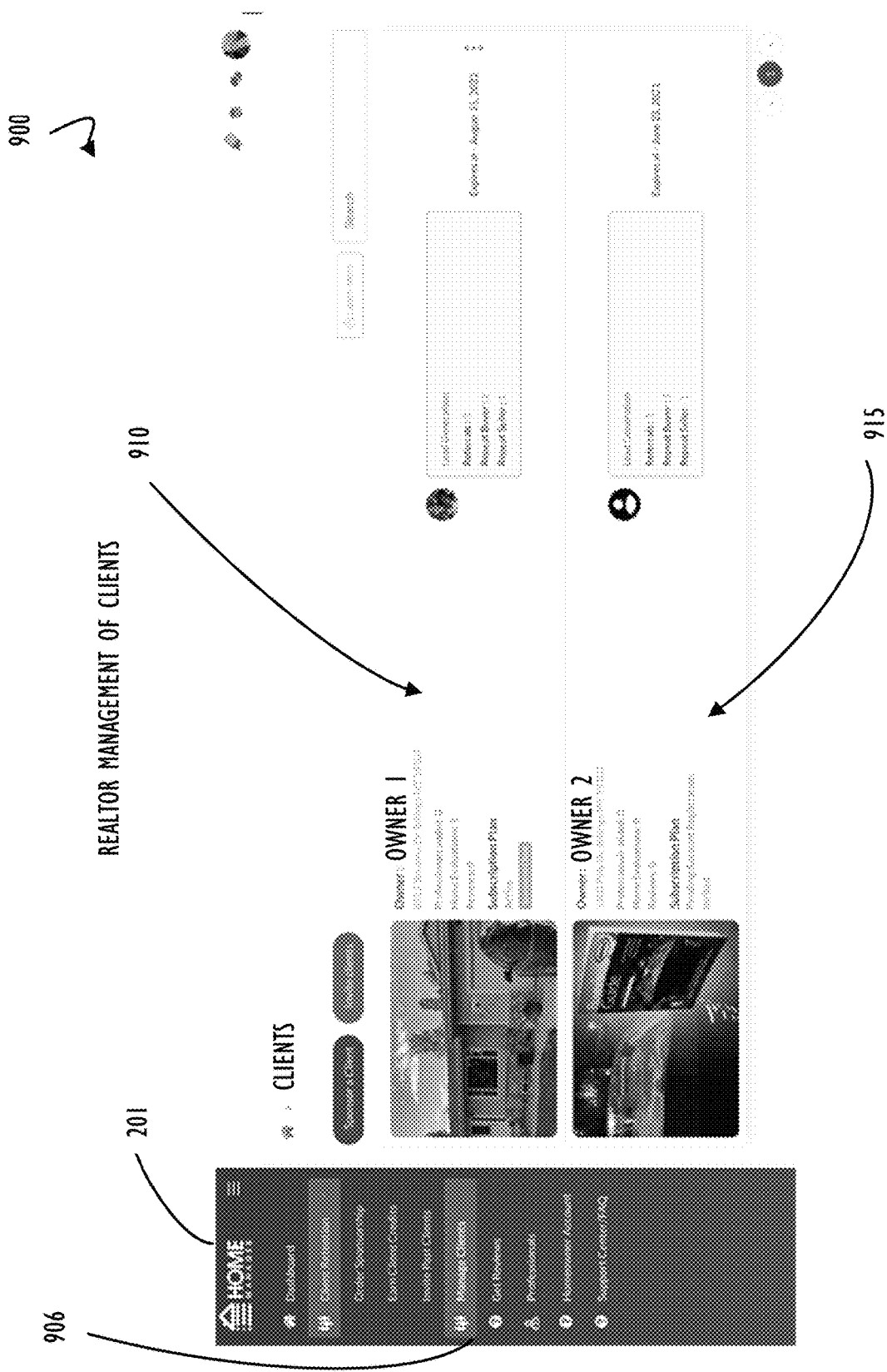
FIG. 9 is an example of a screen shot for a real estate agent to manage client connections, according to one or more examples of this disclosure.

Referring now to FIG. 9, a screen shot 900 is another example of a view that may be provided to a real estate agent as opposed to a homeowner and provides another interface point for the real estate agent. Screen shot 900 maintains navigation pane 201 in which the manage clients tab 906 has been selected to display a real estate agent's management of clients view. Information about "owner 1" 910 is displayed as part of a tabular presentation of individual clients for this particular real estate agent. Information about "owner 2" 915 is displayed beneath the information for "owner 1" 910. This type of view may be useful for a real estate agent to scroll through their clients and obtain current status information related to those clients that is maintained within the cloud-based HomeManager application as disclosed herein. This may also assist real estate agents in keeping track of their past customer base to help them in the future.

Figure 10:
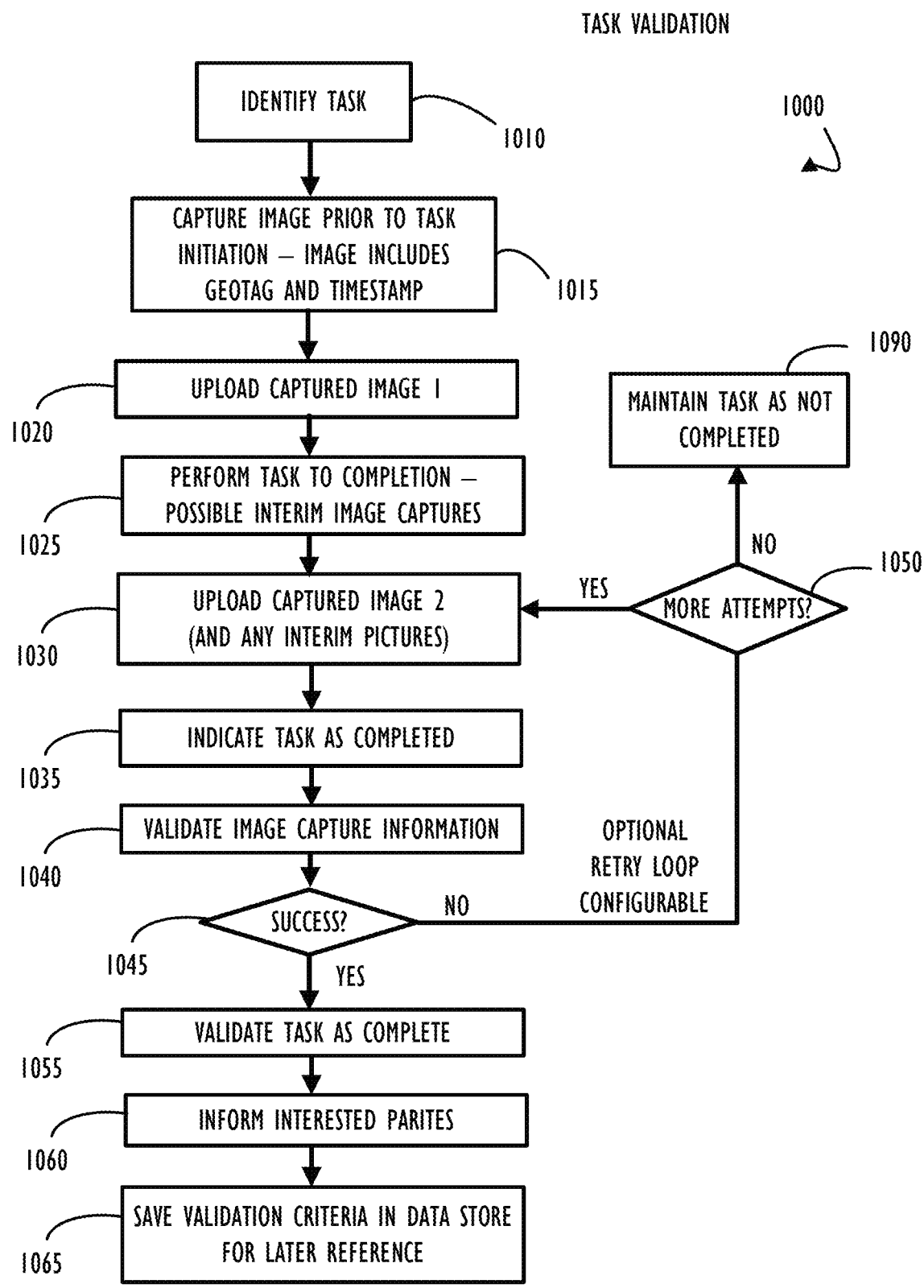
FIG. 10 is an example of a possible workflow to perform automated and secure task validation relative to maintenance tasks alleged to be performed on a given property, according to one or more examples of this disclosure.

Referring now to FIG. 10, example workflow 1000 represents a possible technique to provide for a validated task completion. As discussed above, validated task completion may be desired for certain tasks (e.g., one or more task that may be shown in a maintenance task list view such as that shown in screenshot 400 of FIG. 4) that may have originated because either an insurance company or an HOA mandated an action to be taken on a subject property. In other cases, where a task has not been mandated by an outside authority, a validated task may be initiated by a homeowner such that an audit trail of the maintenance may be maintained. For example, a certification of when a hot water heater or an air conditioning unit was replaced may be helpful when attempting to sell the subject property. In any case, the disclosed technique for validation of task completion provides a high degree of certainty that a particular task was completed at the date associated with that task.

Workflow 1000 begins at block 1010 where a task is identified that is desired to be a validated task. Flow continues to block 1015 where one or more images (e.g., digital photographs) are captured that depict the item or area affected by the identified task (e.g., a picture of an old water heater that is going to be replaced). Flow continues to block 1020 where the one or more images captured prior to the task are uploaded to the HomeManager cloud-based application. Block 1025 indicates that the identified task is performed with possible interim images (e.g., showing progression through task) are captured. Block 1030 indicates that at least one image capture related to completion of the identified task (and any desired interim images) is uploaded. Block 1035 indicates that, after uploads are completed, the task is marked as completed. For example, the status of the task in the maintenance task list discussed above for FIG. 4 is changed to completed.

After the task is indicated as completed and the uploaded images are available for analysis, block 1040 indicates that validation of captured images may be performed. Analysis may include examination of geotag information (which specifically identifies a location at which the picture was captured) and time stamp information (which specifically identifies a time at which the picture was captured) that is embedded within the captured images. For example, by validating that a "before picture" was taken at a certain location and time and then having an "after picture" taken at substantially the same location and a later time, an audit trail of sequential changes at that location may be provided. Storing these pictures may later provide a pictorial audit trail that may, upon simple visual inspection, show that the indicated task was actually completed at the location and time indicated.

Continuing with the example above, the before picture would show the old water heater and the after picture would show the brand new water heater has been installed at substantially the same location for which the old water heater was indicated as being replaced. As indicated at decision 1045, if validation fails (e.g., the location or time is not accurate), the NO branch of decision 1045 is taken to cause flow to continue to decision 1050 to determine if more attempts to provide proper images are available. If more attempts are available for a clerical type error (e.g., improperly selected image for upload) flow may return to block 1030 for a corrected upload. If validation has failed a number of times more than the user is allowed to correct, flow continues to block 1090 (via the NO branch from decision 1050) where the task is maintained as not completed.

Alternatively, if at decision 1045 the validation is a success, flow continues via the YES branch of decision 1050 to block 1055 where the task is marked as completed and validated. Block 1060 indicates that interested parties may be informed that the validated task has been completed. For example, either an HOA or an insurance company may be provided an email to indicate validated task completion. The email may include both the before and after pictures and an indication that the task was performed for the subject property may be provided (e.g., a certificate of completion generated by the HomeManager cloud-based application). Flow continues to block 1065 where all validation criteria may be stored in a data store (e.g., database associated with cloud-based HomeManager application). Storage in the data store may allow for later retrieval and reference to provide an audit trail of the actual task being performed. For example, receipts of purchase/with dates and descriptions/ pricing, contractor agreements and invoices, pictures time stamped, geo tracked, customers terms and conditions acknowledgement upon signup.

Figure 11A:
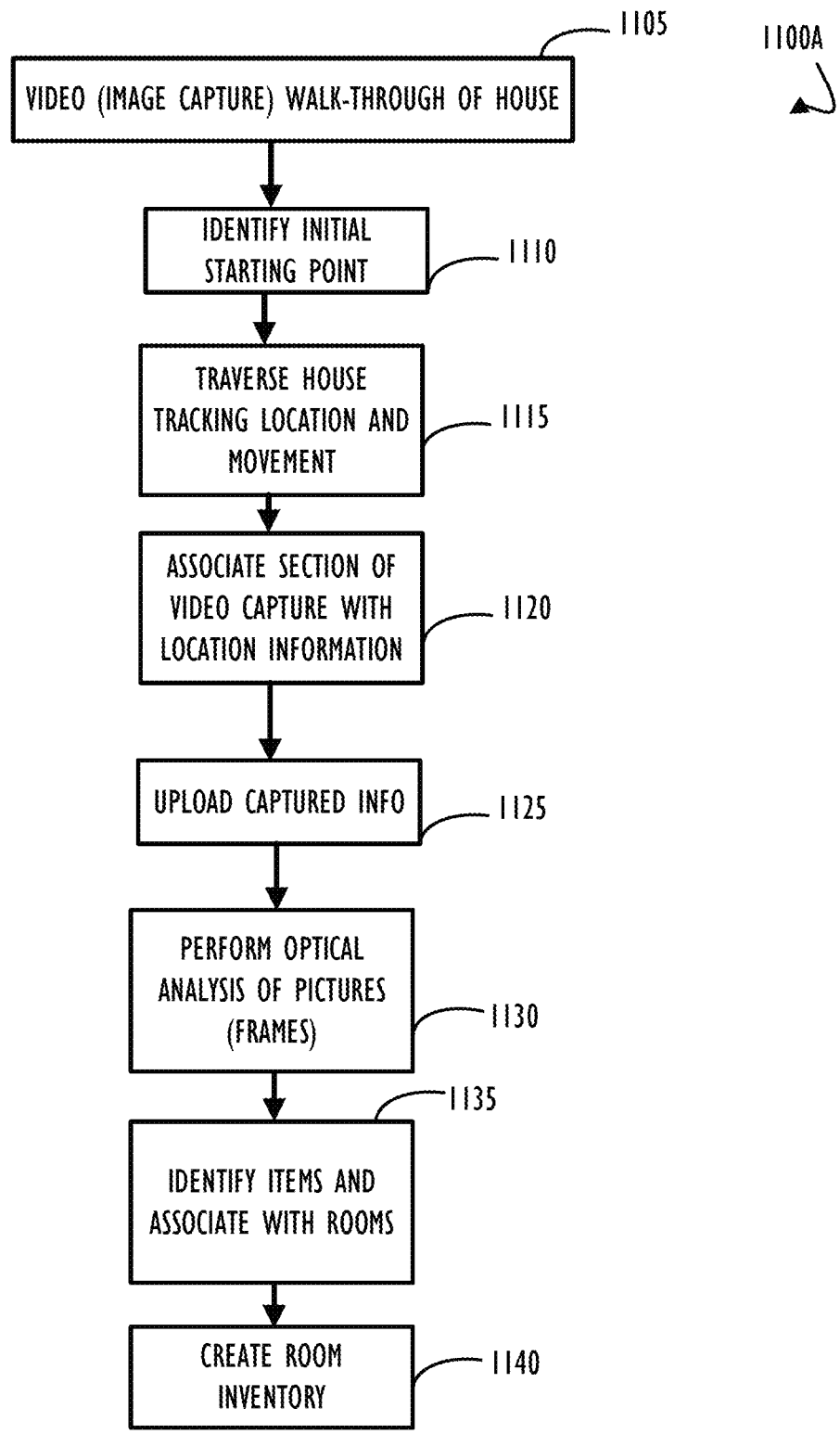
FIGS. 11A-C are respective examples of a possible workflows to perform automated floorplan generation, automated inventory generation, and calculate a HomeScore on a given property, according to one or more examples of this disclosure.
Figure 11B:
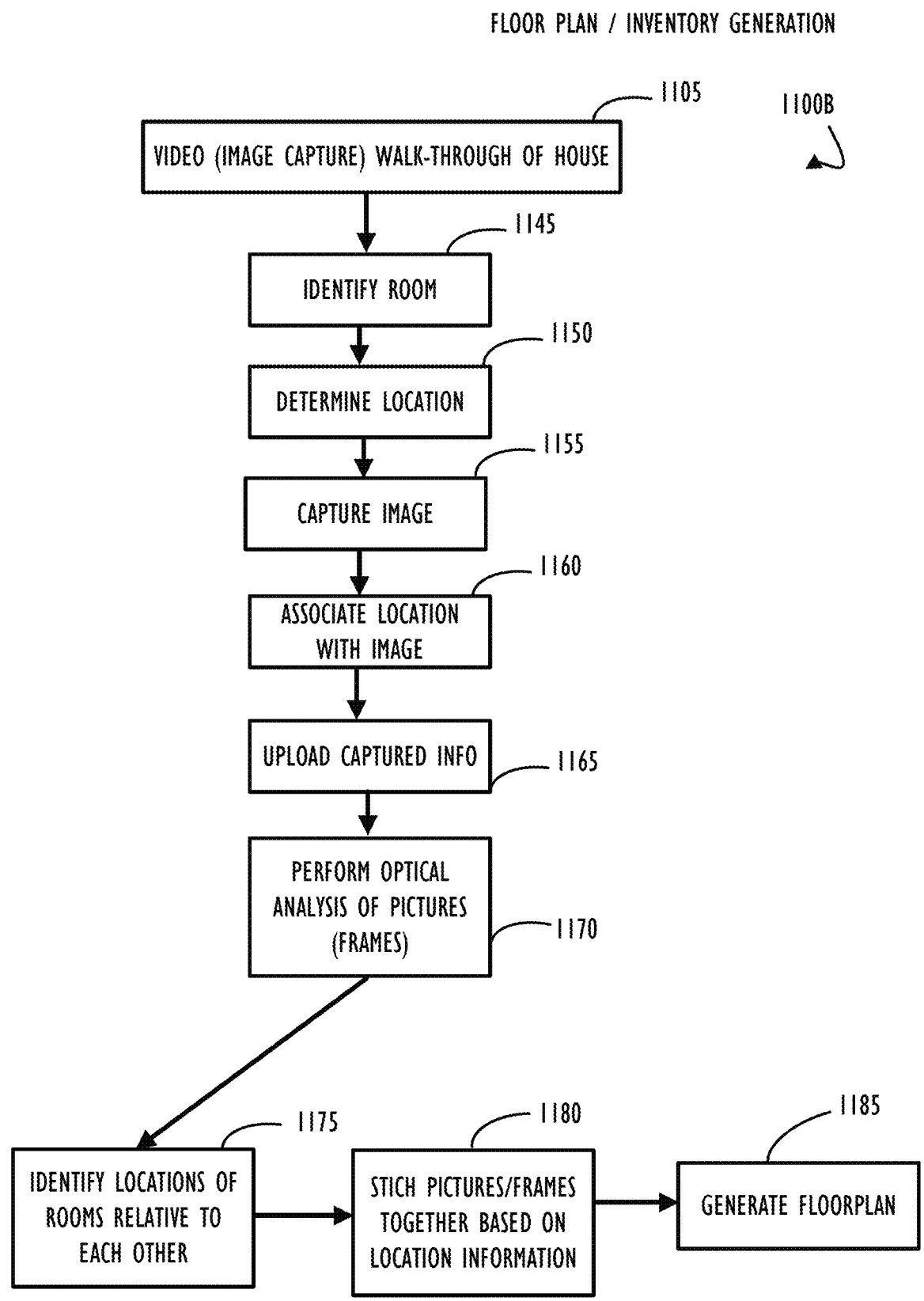
Figure 11C:
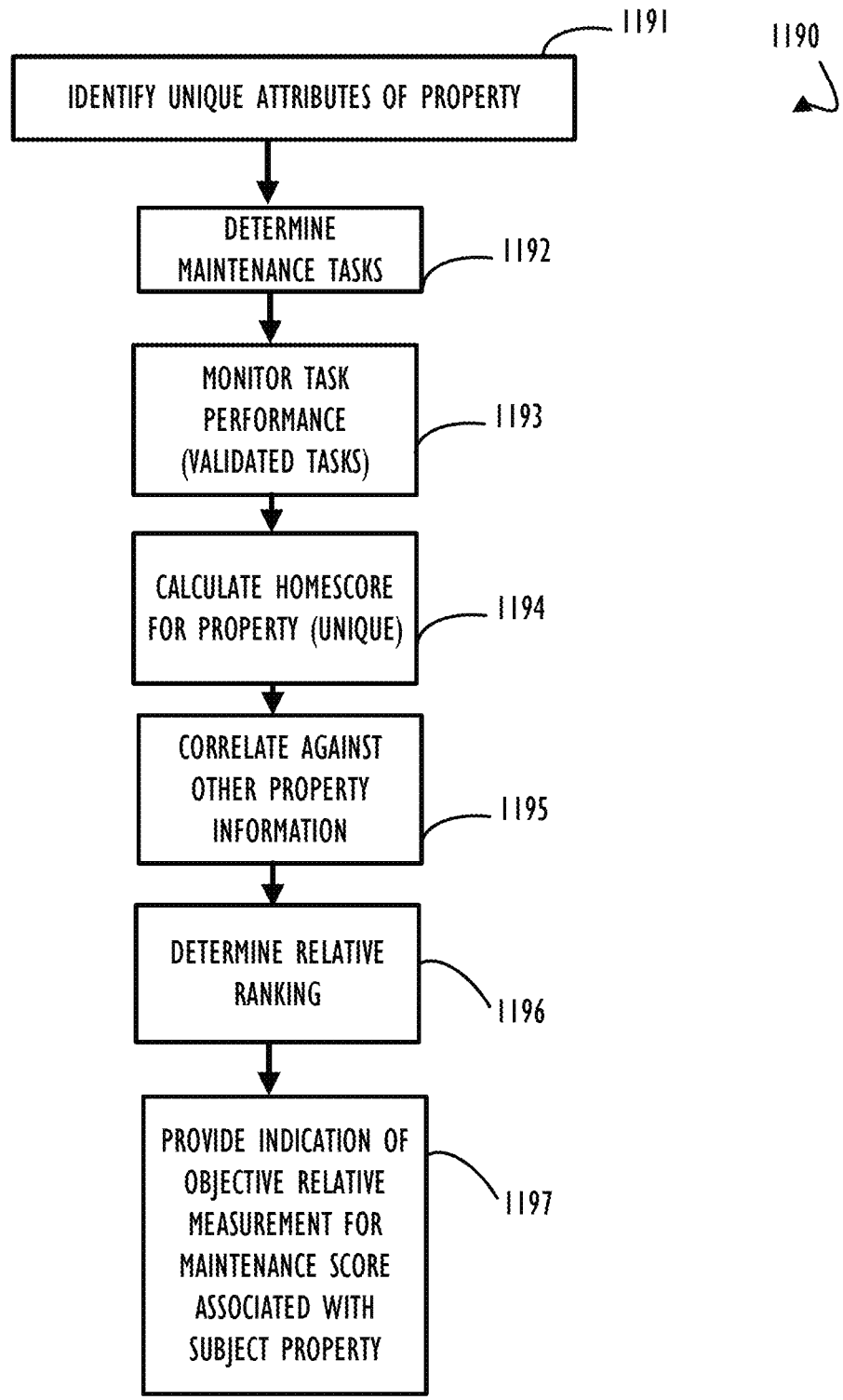

Referring now to FIGS. 11A-C, several example workflows for different aspects of the disclosed HomeManager cloud-based application are illustrated. In FIG. 11A, example workflow 1100A represents a possible technique to provide for an automated room inventory generation for a homeowner. Example workflow 1100 begins at block 1105 where a video or still image capture sequence may be collected, for example, by a walk-through of the subject property. For a video capture, block 1110 indicates that an initial starting point within the property may be identified. Block 1115 indicates that the property may be traversed and the relative location from the identified initial starting point may be maintained/determined. Block 1120 indicates that individual sections of the video capture (e.g., a set of frames) may be associated with location information (e.g., a particular room).

Location of the initial room may be determined (e.g., by using information from a global positioning system "GPS" accessible by the image capture device such as a digital camera). Block 1120 further indicates that an image may be captured, and location information may be associated with that captured image. This process may be repeated for one or more rooms of the subject property to collect a set of still images or to identify selected frames from a video capture.

Block 1125 indicates that the captured image data may be uploaded, for example, to the disclosed cloud-based HomeManager application. Block 1130 indicates that optical analysis of either still images or frames from a video capture may be performed. Block 1135 indicates that items within a given room may optionally be identified or that specific images may be associated with individual rooms within the subject property in this particular example. Block 1140 indicates that a room inventory may optionally be populated to indicate any items identified by the previously performed optical analysis in this particular example. In practice, this automatically generated inventory may be augmented by a homeowner at a later date as necessary to reflect any items not automatically identified or to adjust for changes that take place over time.

In example workflow 1100B of FIG. 11B, a floor plan generation may be performed. As discussed above, floorplan generation may provide a layout of the rooms of a house to provide a general layout of the property or to generate escape routes or search locations in the event of an emergency. For example, if a floorplan is available to first responders responding to a fire, flood, tornado, or an earthquake, different areas of the house may be prioritized in an effort to search for survivors trapped in potential safe areas of the house (e.g., bathrooms, safe rooms, etc.). and assist them in locating services like gas, water and electric to turn off for safety of first responders and occupants.

Example workflow 1100B begins at block 1105 where a video or still image capture sequence may be collected, for example, by a walk-through of the subject property. In a similar manner to workflow 1100A, an initial starting point within the property may be identified (e.g., as a starting room at block 1145). Block 1150 indicates that location information may be periodically determined as the property is traversed and the relative location from the identified initial starting point may be maintained/determined. Block 1155 indicates that image capture during traversal may be performed so that individual sections of the video capture (e.g., a set of frames) may be associated with location information (e.g., a particular room).

As above, the location of the initial room may be determined (e.g., by using information from a global positioning system "GPS" accessible by the image capture device such as a digital camera). Block 1160 indicates that location information may be associated with that captured image. This process may be repeated for one or more rooms of the subject property to collect a set of still images or frames of a video that are each associated with specific rooms.

Block 1165 indicates that the captured image data may be uploaded, for example, to the disclosed cloud-based HomeManager application. Block 1170 indicates that optical analysis of either still images or frames from a video capture may be performed. Block 1175 indicates that locations of a given room may be identified or that specific images may be associated with individual rooms within the subject property in this particular example.

To generate a floorplan, flow 100B continues from block 1170 to block 1175 where relative locations of rooms may be determined. At block 1180, the images (or frames) may be stitched together based on the location information. The walls of the rooms may be identified, and relative locations of images used to identify inter-room boundaries within the subject property. Using the above analysis, block 1185 indicates that a floorplan may be generated.

In FIG. 11C, example workflow 1190 illustrates how a HomeScore objective ranking may be calculated. Example workflow 1190 begins at block 1191 where unique attributes of a subject property may be identified. Block 1192 indicates that specific maintenance tasks may be identified to create a unique set of tasks for a subject property. Block 1193 indicates that, over time, tasks may be performed and validated for the subject property. Block 1194 indicates that a HomeScore may be calculated that is individualized for the subject property using the unique set of tasks for that property. Block 1195 indicates that a subject property HomeScore may be correlated against a set of comparative properties to determine, for example, a relative ranking of how well maintenance tasks have been performed for the subject property versus a larger set of comparative properties. Block 1196 indicates that a relative ranking may be determined using the above analysis. Block 1197 indicates that an indication of the objective ranking measurement may be provided. For example, the objective ranking (based on HomeScore) may be provided to assist in determination of a value for the subject property.

Referring now to FIGS. 12-15, examples of systems, system interactions, and system components that may be used to implement the disclosed HomeManager cloud-based application will be discussed.

Figure 12:
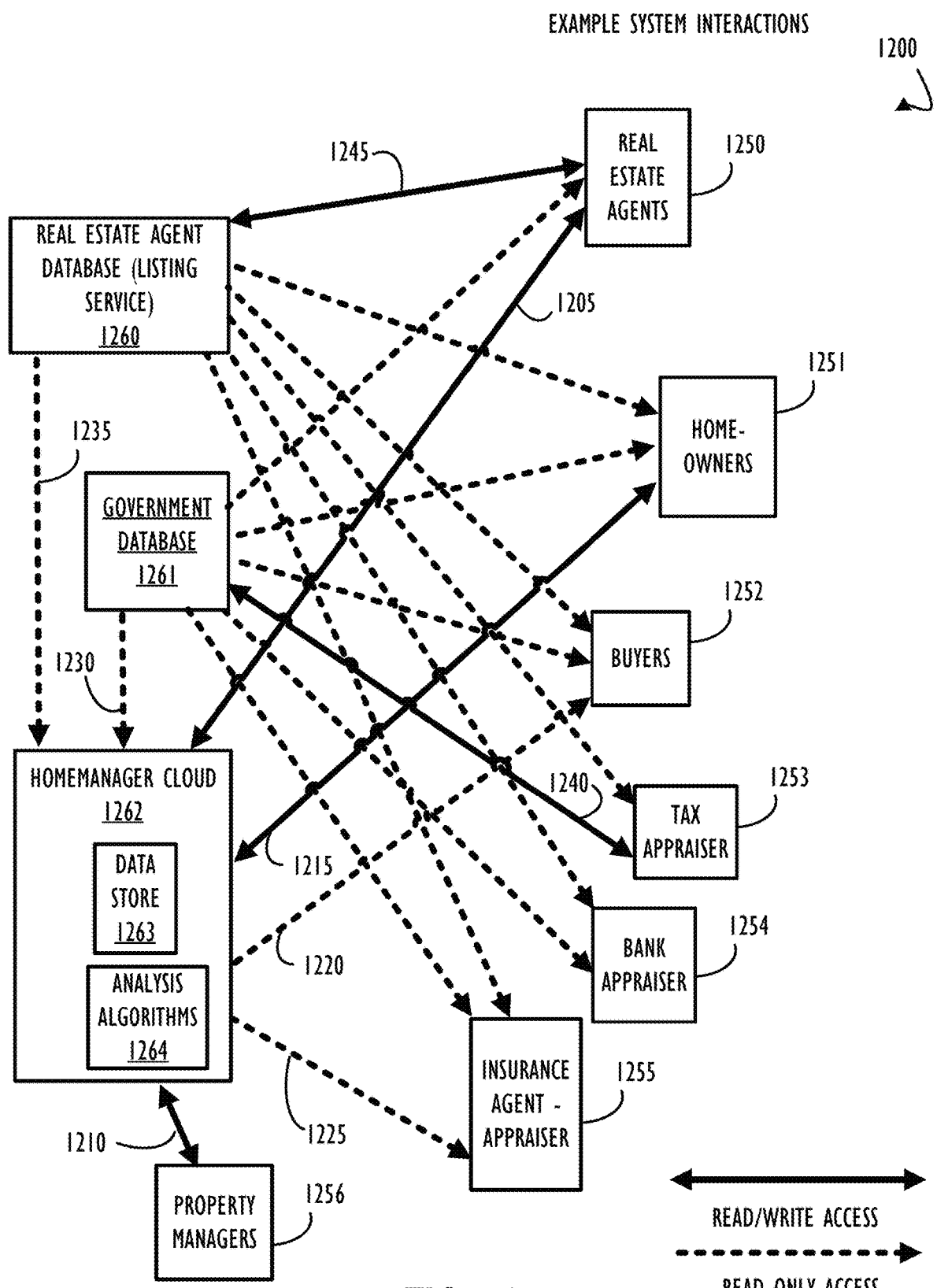
FIG. 12 is an example of possible system interactions providing data gathering and interaction examples for different user types that may interface with a home management system, according to one or more examples of this disclosure.

FIG. 12 illustrates example system interactions 1200 to collect and maintain information for use by a HomeManager cloud-based application, in accordance with one or more examples of this disclosure. In FIG. 12, access types are indicated as either A) read/write access using a solid bidirectional arrow between interacting users and/or systems or B) read only access using a dashed unidirectional arrow to indicate the direction of data flow. For example, real estate agents 1250 have read/write access to real estate agent database 1260 as indicated by solid bidirectional arrow 1245. In contrast, an insurance-agent appraiser 1255 may only pull data in a read only fashion from HomeManager cloud 1262 as indicated by dashed unidirectional arrow 1225. Not all arrows for system interactions 1200 are discussed in detail but the data interaction type is indicated based on this arrow type distinction. These interaction types are only examples and different implementation needs may provide for different access types and possibly additional user types.

The users outlined in example system interactions 1200 include real estate agents 1250, homeowners 1251, buyers 1252, tax appraisers 1253, bank appraisers 1254, insurance agent or insurance appraiser-adjuster 1255, and property managers 1256. The systems outlined in example system interactions 1200 include real estate agent database 1260, government database 1261, and HomeManager cloud 1262. In this example, HomeManager cloud 1262 includes two subcomponents that include data store 1263 and analysis algorithms 1264.

Data store 1263 represents a home management database for storing and maintaining all the information discussed in this disclosure for a subject property that is maintained using the HomeManager cloud application and to maintain relative information for properties that are not directly maintained using the HomeManager cloud application (i.e., properties used for relative ranking analysis in addition to those that are directly maintained). Analysis algorithms 1264 represents functional logic for performing all the methods and techniques of this disclosure for a subject property and to perform the correlation analysis and datamining techniques to create the disclosed HomeScore and relative ranking indices discussed herein.

In some implementations, HomeManager cloud 1262 may include additional components that are not specifically shown here and each of data store 1263 and analysis algorithms 1264 may include multiple physically or logically separated functions or partitions of data. The example of FIG. 12 is to be considered a high level overview of possible system interactions to aid in the understanding of the disclosed HomeManager cloud-based application.

Having the above understanding, real estate agent database 1260 is primarily used to support activities of real estate agents 1250. Each individual real estate agent may have the ability to update or view information in real estate agent database 1260 that is associated with any property they are listing as a sales agent. Also, as indicated by solid bidirectional arrow 1205, individual real estate agents may have the ability to update or view selected information in HomeManager cloud 1262. In particular, individual real estate agents may be able to maintain information about client sponsorships or maintain other information associated with the above discussed real estate agent view capabilities into the disclosed HomeManager cloud-based application. Finally, individual real estate agents would not have the ability to write data to government database 1261 and thus are provided read-only access (as the general public is also provided).

Government database 1261 is used in this example to illustrate data regarding a subject property that is maintained by different government agencies. In particular, tax appraiser 1253 is provided read/write access to government database 1261 as indicated by bidirectional arrow 1240. In this example, the only user type with write access to government database 1261 is tax appraisers 1254 and the general public is provided read access to much of this government data.

In this particular example, property managers 1256 are not shown to have access to government database 1261 merely to illustrate that from the context of that user type, data maintained in government database 1261 would not necessarily be useful for their job function. Specifically, property managers 1256 are illustrated as having read/write access to HomeManager cloud 1262 (via solid bidirectional arrow 1210) because their job function would be to maintain information about, and complete maintenance tasks as opposed to being specifically concerned with either selling the subject property or maintaining a financial interest in the subject property. The role of property managers 1256 is, in this example, merely to maintain the property (likely multiple properties).

Homeowners 1251 have read access to both real estate agent database 1260 and government database 1261 but have read/write access to HomeManager cloud 1262 as indicated by solid bidirectional arrow 1215. Thus, individual homeowners may have the ability to maintain and update significant amounts of information related to their associated properties for which information is maintained (e.g., via subscription to the cloud-based HomeManager application). Some information maintained within HomeManager cloud 1262 would not be directly writeable by the homeowner based on criteria for the different types of information. Specifically, even though a homeowner may update some information about their associated properties (e.g., task status, budget information, etc.) they would not be able to change the assessed value for that property. The assessed value would be obtained automatically from government database 1261 as indicated by dashed unidirectional arrow 1230. This is just one example of data that may not be updated by a homeowner for a property they own.

Buyers 1252 may benefit from obtaining information about a subject property from each of the three systems illustrated in system interactions 1200 but would not have write access to any of the databased under their role as a potential buyer. In this example, buyers 1252 may have read access to data from HomeManager cloud 1262 as indicated by dashed unidirectional arrow 1220. Specifically, buyers 1252 may utilize information from different sources to help them determine a relative value for different properties that they may be interested in purchasing. Of course, once purchased that user may transition from a buyer role to a homeowner role.

As briefly mentioned above, insurance agent—appraiser 1255 may be involved in processing an insurance claim for a subject property or may be responsible to check that a required repair has been performed on the subject property. Thus, the insurance agent—appraiser 1255 may have read only access to HomeManager cloud 1262 to obtain information pertaining to a "validated task" as discussed above. Other examples of data maintained within HomeManager cloud 1262 may also be useful to the insurance agent—appraiser 1255 in addition to validated task information (e.g., data to provide a policy discount).

Finally, as respectively indicated by dashed unidirectional arrow 1230 and unidirectional arrow 1235, HomeManager cloud 1262 may pull information about properties from each of government database 1261 and/or real estate agent database 1260. This information may be utilized to augment information maintained by the homeowner to provide a complete and detailed view with respect to financial planning aspects of a given property. Taxing information and sales information may be useful to a homeowner when budgeting for updates to any property for which they are the homeowner.

Figure 13:
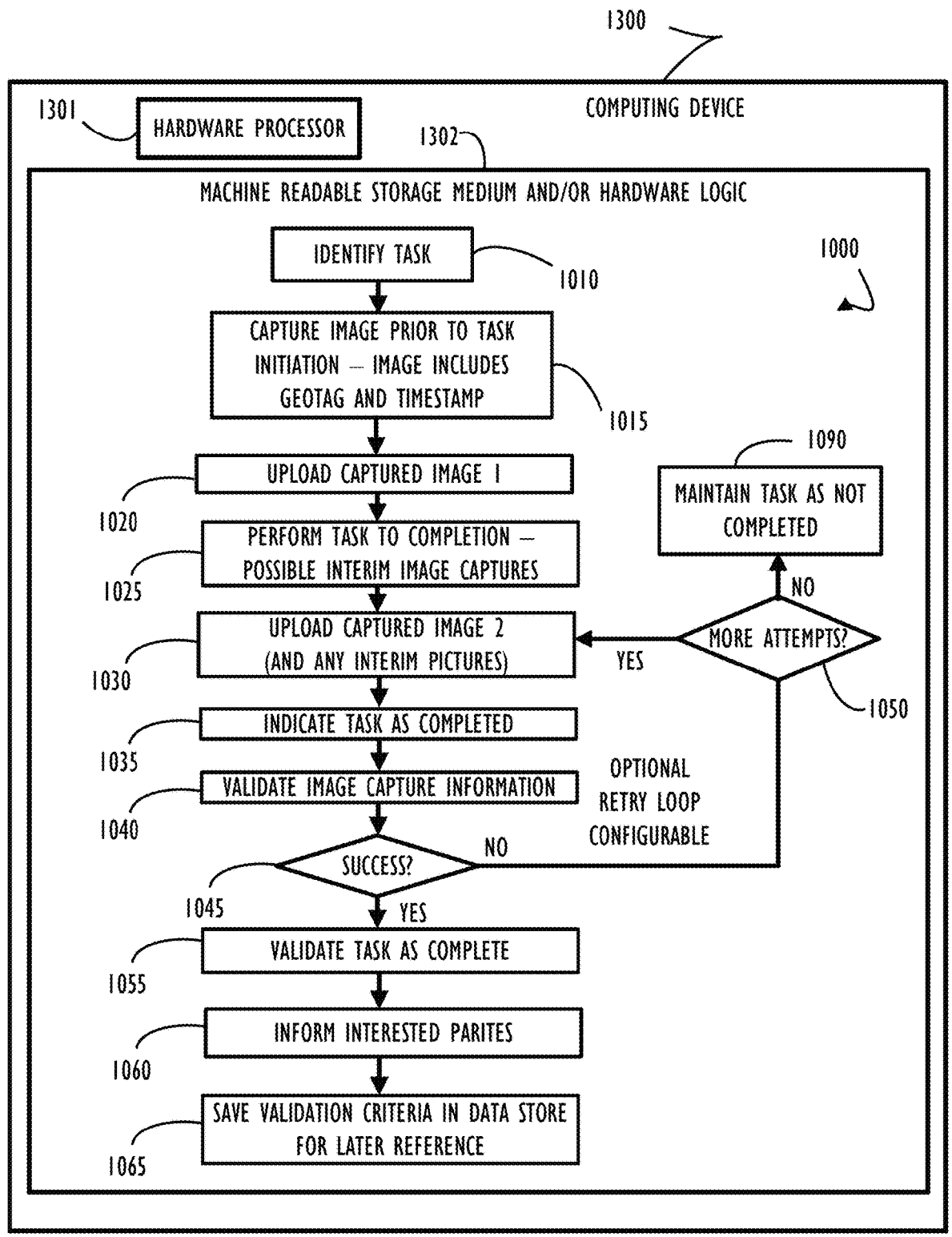
FIG. 13 is an example of a computing device, including a computer readable medium, that may be used to implement one or more of the workflows (in this case the workflow of FIG. 10) of this disclosure, according to one or more examples of this disclosure.

Referring now to FIG. 13, shown is an example computing device 1300, with a hardware processor 1301, and accessible machine-readable instructions stored on a machine-readable medium and/or hardware logic 1302 that may be used to perform one or more functions of the HomeManager cloud-based application, according to one or more disclosed example implementations. Specifically, FIG. 13 illustrates computing device 1300 configured to perform the example workflow 1000 as an example. However, computing device 1300 may also be configured to perform the flow of other methods, techniques, functions, or processes described in this disclosure. In this example of FIG. 13, machine-readable storage medium 1302 includes instructions to cause hardware processor 1301 to perform blocks 1010-1090 discussed above with reference to FIG. 10. Different implementations of method 1000 are possible, including hardware logic configured on a chip to implement all or part of method 1000 in conjunction with an overall implementation of disclosed techniques to provide a cloud-based HomeManager application.

A machine-readable storage medium, such as 1302 of FIG. 13, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 14:
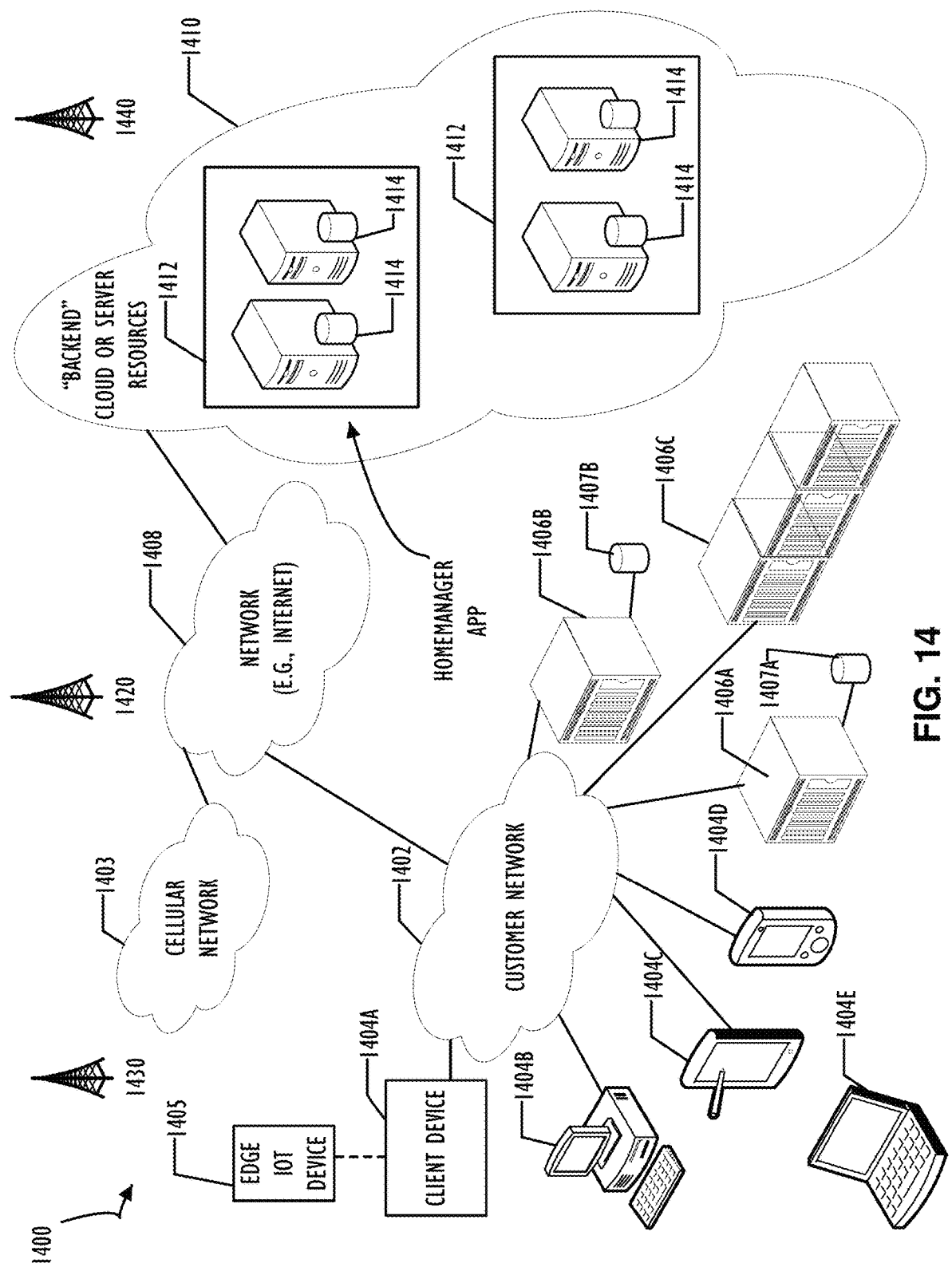
FIG. 14 is an example of networked computer components and devices to illustrate possible processing resources, user interface points, and data pathways, according to one or more examples of this disclosure.

FIG. 14 represents a network infrastructure 1400 that may be used to implement all, or part of the disclosed cloud-based HomeManager application, according to one or more disclosed embodiments. Network infrastructure 1400 includes a set of networks where embodiments of the present disclosure may operate. Network infrastructure 1400 comprises a customer network 1402, network 1408, cellular network 1403, and a cloud service provider network 1410. In one embodiment, customer network 1402 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 1402 represents an enterprise network that could include or be communicatively coupled to one or more local area networks (LANs), virtual networks, data centers and/or other remote networks (e.g., 1408, 1410). In the context of the present disclosure, customer network 1402 may include one or more high-availability switches or network devices using methods and techniques such as those described above. Specifically, compute resource 1406B and/or compute resource 1406A may be configured as a network infrastructure device incorporating storage devices (e.g., 1407A and 1407B).

As shown in FIG. 14, customer network 1402 may be connected to one or more client devices 1404A-E and allow the client devices 1404A-E to communicate with each other and/or with cloud service provider network 1410, via network 1408 (e.g., the Internet). Client devices 1404A-E may be computing systems such as desktop computer 1404B, tablet computer 1404C, mobile phone 1404D, laptop computer (shown as wireless) 1404E, and/or other types of computing systems generically shown as client device 1404A. In the examples of this disclosure, it is likely the different user types outlined in FIG. 12 may obtain access to the HomeManager cloud-based application via a client device such as those illustrated in network infrastructure 1400.

Network infrastructure 1400 may also include other types of devices generally referred to as Internet of Things ("IOT") (e.g., edge IOT device 1405) that may be configured to send and receive information via a network to access cloud computing services or interact with a remote web browser application (e.g., to receive information or respond to requested information). In some implementations edge IOT device 1405 may provide information to assist in automated task validation. Specifically, if maintenance is performed at a property and information pertaining to that maintenance is available to edge IOT device 1405 then that information may be uploaded to the disclosed HomeManager cloud-based application. For example, an air conditioning system may incorporate edge IOT device 1405 and communicate that a compressor for that air conditioning system has been replaced or updated.

FIG. 14 also illustrates that customer network 1402 includes local compute resources 1406A-C that may include a server, access point, router, or other device configured to provide for local computational resources and/or facilitate communication amongst networks and devices. For example, local compute resources 1406A-C may be one or more physical local hardware devices. Local compute resources 1406A-C may also facilitate communication between other external applications, data sources (e.g., 1407A and 1407B), and services, and customer network 1402.

Network infrastructure 1400 also includes cellular network 1403 for use with mobile communication devices. Mobile cellular networks support mobile phones and many other types of mobile devices such as laptops etc. Mobile devices in network infrastructure 1400 are illustrated as mobile phone 1404D, laptop computer 1404E, and tablet computer 1404C. A mobile device such as mobile phone 1404D may interact with one or more mobile provider networks as the mobile device moves, typically interacting with a plurality of mobile network towers 1420, 1430, and 1440 for connecting to the cellular network 1403.

FIG. 14 illustrates that customer network 1402 is coupled to a network 1408. Network 1408 may include one or more computing networks available today, such as other LANs, wide area networks (WAN), the Internet, and/or other remote networks, in order to transfer data between client devices 1404A-D and cloud service provider network 1410 (e.g., a cloud service provider hosting the disclosed HomeManager application). Each of the computing networks within network 1408 may contain wired and/or wireless programmable devices that operate in the electrical and/or optical domain.

In FIG. 14, cloud service provider network 1410 is illustrated as a remote network (e.g., a cloud network) that is able to communicate with client devices 1404A-E via customer network 1402 and network 1408. The cloud service provider network 1410 acts as a platform that provides additional computing resources to the client devices 1404A-E and/or customer network 1402. In one embodiment, cloud service provider network 1410 includes one or more data centers 1412 with one or more server instances 1414. Cloud service provider network 1410 may also include one or more frames or clusters (and cluster groups) representing a scalable compute resource that may implement the techniques of this disclosure.

Figure 15:
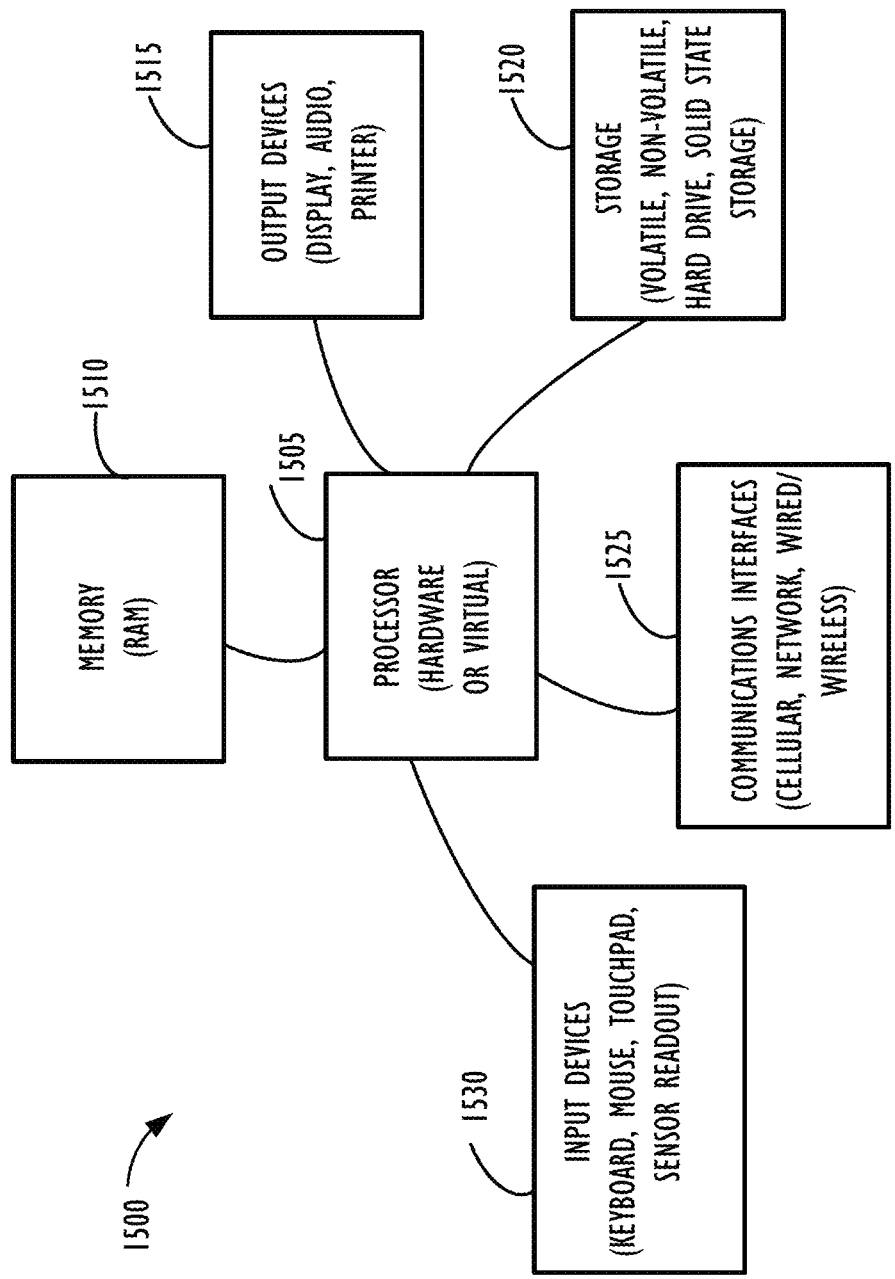
FIG. 15 is a block diagram providing an example of a computing device that may be used within one or more of the devices illustrated in FIG. 14 (or even other devices).

FIG. 15 illustrates a computing device 1500 that may be used to implement or be used with the functions, modules, processing platforms, execution platforms, communication devices, and other methods and processes of this disclosure. For example, computing device 1500 illustrated in FIG. 15 could represent a client device or a physical server device and include either hardware or virtual processor(s) depending on the level of abstraction of the computing device. In some instances (without abstraction), computing device 1500 and its elements, as shown in FIG. 15, each relate to physical hardware. Alternatively, in some instances one, more, or all of the elements could be implemented using emulators or virtual machines as levels of abstraction. In any case, no matter how many levels of abstraction away from the physical hardware, computing device 1500 at its lowest level may be implemented on physical hardware.

As also shown in FIG. 15, computing device 1500 may include one or more input devices 1530, such as a keyboard, mouse, touchpad, or sensor readout (e.g., biometric scanner) and one or more output devices 1515, such as displays, speakers for audio, or printers. Some devices may be configured as input/output devices also (e.g., a network interface or touchscreen display).

Computing device 1500 may also include communications interfaces 1525, such as a network communication unit that could include a wired communication component and/or a wireless communications component, which may be communicatively coupled to processor 1505. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 15, computing device 1500 includes a processing element such as processor 1505 that contains one or more hardware processors, where each hardware processor may have a single or multiple processor cores. As mentioned above, each of the multiple processor cores may be paired with a NVMe queue pair to facilitate implementations of this disclosure. In one embodiment, the processor 1505 may include at least one shared cache that stores data (e.g., computing instructions) that are utilized by one or more other components of processor 1505. For example, the shared cache may be a locally cached data stored in a memory for faster access by components of the processing elements that make up processor 1505. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 15, the processing elements that make up processor 1505 may also include one or more of other types of hardware processing components, such as graphics processing units (GPU), application specific integrated circuits (ASICs), field-programmable gate arrays (FPGAs), and/or digital signal processors (DSPs).

FIG. 15 illustrates that memory 1510 may be operatively and communicatively coupled to processor 1505. Memory 1510 may be a non-transitory medium configured to store various types of data. For example, memory 1510 may include one or more storage devices 1520 that comprise a non-volatile storage device and/or volatile memory. Volatile memory, such as random-access memory (RAM), can be any suitable non-permanent storage device. The non-volatile storage devices 1520 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1520 may be used to store overflow data if allocated RAM is not large enough to hold all working data. The non-volatile storage devices 1520 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1505. In one embodiment, the compiling process of the software program may transform program code written in a programming language to another computer language such that the processor 1505 is able to execute the programming code. For example, the compiling process of the software program may generate an executable program that provides encoded instructions (e.g., machine code instructions) for processor 1505 to accomplish specific, non-generic, particular computing functions.

After the compiling process, the encoded instructions may then be loaded as computer executable instructions or process steps to processor 1505 from storage device 1520, from memory 1510, and/or embedded within processor 1505 (e.g., via a cache or on-board ROM). Processor 1505 may be configured to execute the stored instructions or process steps in order to perform instructions or process steps to transform the computing device into a non-generic, particular, specially programmed machine or apparatus. Stored data, e.g., data stored by a storage device 1520, may be accessed by processor 1505 during the execution of computer executable instructions or process steps to instruct one or more components within the computing device 1500.

A user interface (e.g., output devices 1515 and input devices 1530) can include a display, positional input device (such as a mouse, touchpad, touchscreen, or the like), keyboard, or other forms of user input and output devices. The user interface components may be communicatively coupled to processor 1505. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1500 may comprise other components well known in the art, such as sensors, powers sources, and/or analog-to-digital converters, not explicitly shown in FIG. 15.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method to rate a subject property relative to a plurality of other properties, the method comprising:

obtaining, by a processor of a computer system, a first set of maintenance metrics reflecting maintenance activities performed on the subject property, the maintenance activities tailored to attributes of the subject property;

obtaining, by the processor of the computer system, a second set of maintenance metrics reflecting maintenance activities performed on a first other property from the plurality of other properties;

obtaining, by the processor of the computer system, a third set of maintenance metrics reflecting maintenance activities performed on a second other property from the plurality of other properties, the second other property different from the first other property;

identifying, using the processor of the computer system, a subset of the first set, the second set, and the third set such that the subset includes validated completed tasks for each respective property, each of the validated completed tasks associated with a respective first before digital image, taken prior to task initiation of a respective validated completed task, and a respective second after digital image, taken after task completion of the respective validated completed task, each of the first before digital image and the second after digital image having an embedded geotag and timestamp having been previously extracted and verified, using the processor of the computer system, to store an indication in non-transitory storage, the indication verifying and identifying that the before digital image and the after digital image are temporally and geographically proper with respect to the respective validated completed task;

analyzing, using the processor of the computer system, the first, second, and third set of maintenance metrics by correlating maintenance activities respectively performed on each of the subject property, first other property, and second other property to one another to determine a HomeScore for the subject property, wherein determining the HomeScore includes applying a greater weight to each validated completed task relative to a correlated unvalidated completed task for a different property;

determining, using the processor of the computer system, a relative ranking of the subject property to the first other property and the second other property based on the analysis;

adjusting, using the processor of the computer system, the relative ranking based on a scale associated with comparative properties; and providing, using the processor of the computer system, the relative ranking for the subject property, the relative ranking based, in part, on the HomeScore reflecting a relative maintenance grade for the subject property.

2. The computer-implemented method of claim 1, wherein the subject property is a residential property selected from the group consisting of: a single family house, a townhome, a condominium, an apartment, and a multi-unit dwelling.

3. The computer-implemented method of claim 1, wherein adjusting the relative ranking based on a scale includes adjusting the relative ranking using data from each of a real estate agent database, a government database, and a home management database storing data reflecting other similarly situated properties.

4. The computer-implemented method of claim 1, wherein analyzing the first, second, and third set of metrics includes determining adherence to a prescribed list of maintenance tasks and timely completion of each task from the prescribed list.

5. The computer-implemented method of claim 4, wherein adherence includes providing a greater weight to validated completed tasks over unvalidated completed tasks.

6. The computer-implemented method of claim 1, wherein the HomeScore for the subject property is provided to a home insurance provider as part of determining insurability or insurance cost for the subject property.

7. The computer-implemented method of claim 1, wherein the HomeScore for the subject property is provided to a real estate agent or a prospective home buyer.

8. A non-transitory computer-readable medium including instructions store thereon that when executed by a computer processor cause the computer processor to determine a HomeScore for a subject property relative to a plurality of other properties, the instructions to cause the computer processor to:
obtain a first set of maintenance metrics reflecting maintenance activities performed on the subject property, the maintenance activities tailored to attributes of the subject property;
obtain a second set of maintenance metrics reflecting maintenance activities performed on a first other property from the plurality of other properties;
obtain a third set of maintenance metrics reflecting maintenance activities performed on a second other property from the plurality of other properties, the second other property different from the first other property;
identify a subset of the first set, the second set, and the third set such that the subset includes validated completed tasks for each respective property, each of the validated completed tasks associated with a respective first before digital image, taken prior to task initiation of a respective validated completed task, and a respective second after digital image, taken after task completion of the respective validated completed task, each of the first before digital image and the second after digital image having an embedded geotag and timestamp having been previously extracted and verified, using the computer processor, to store an indication in non-transitory storage, the indication verifying and identifying that the before digital image and the after digital image are temporally and geographically proper with respect to the respective validated completed task;
analyze the first, second, and third set of metrics by correlating maintenance activities respectively performed on each of the subject property, first other property, and second other property to one another to determine a HomeScore for the subject property, wherein determining the HomeScore includes applying a greater weight to each validated completed task relative to a correlated unvalidated completed task for a different property;
determine a relative ranking of the subject property to the first other property and the second other property based on the analysis;
adjust the relative ranking based on a scale associated with comparative properties; and
provide the relative ranking for the subject property, the relative ranking based, in part, on the HomeScore reflecting a relative maintenance grade for the subject property.

9. The non-transitory computer-readable medium of claim 8, wherein the subject property is a residential property selected from the group consisting of: a single family house, a townhome, a condominium, an apartment, and a multi-unit dwelling.

10. The non-transitory computer-readable medium of claim 8, wherein the instructions to cause the computer processor to adjust the relative ranking based on a scale include instructions to cause the computer processor to adjust the relative ranking using data from each of a real estate agent database, a government database, and data reflecting other similarly situated properties stored in a home management database.

11. The non-transitory computer-readable medium of claim 8, wherein the instructions to cause the computer processor to analyze the first, second, and third set of metrics include instructions to cause the computer processor to determine adherence to a prescribed list of maintenance tasks and timely completion of each task from the prescribed list.

12. The non-transitory computer-readable medium of claim 11, wherein adherence includes providing a greater weight to validated completed tasks over unvalidated completed tasks.

13. The non-transitory computer-readable medium of claim 8, wherein the instructions to cause the computer processor to determine the HomeScore for the subject property include instructions to cause the computer processor to provide the HomeScore to a home insurance provider as part of determining insurability or insurance cost for the subject property.

14. The non-transitory computer-readable medium of claim 8, wherein the instructions to cause the computer processor to provide the relative ranking for the subject property include instructions to cause the computer processor to provide the relative ranking to a real estate agent or a prospective home buyer.

15. A cloud-based computer system comprising one or more computer processors configured with computer instructions that when executed cause the one or more computer processors to determine a HomeScore and relative ranking for a subject property relative to a plurality of other properties, the computer instructions to cause the one or more computer processors to:
obtain a first set of maintenance metrics reflecting maintenance activities performed on the subject property, the maintenance activities tailored to attributes of the subject property;
obtain a second set of maintenance metrics reflecting maintenance activities performed on a first other property from the plurality of other properties;
obtain a third set of maintenance metrics reflecting maintenance activities performed on a second other property from the plurality of other properties, the second other property different from the first other property;

identify a subset of the first set, the second set, and the third set such that the subset includes validated completed tasks for each respective property, each of the validated completed tasks associated with a respective first before digital image, taken prior to task initiation of a respective validated completed task, and a respective second after digital image, taken after task completion of the respective validated completed task, each of the first before digital image and the second after digital image having an embedded geotag and timestamp having been previously extracted and verified, using the one or more computer processors, to store an indication in non-transitory storage, the indication verifying and identifying that the before digital image and the after digital image are temporally and geographically proper with respect to the respective validated completed task;

analyze the first, second, and third set of metrics by correlating maintenance activities respectively performed on each of the subject property, first other property, and second other property to one another to determine a HomeScore for the subject property, wherein determining the HomeScore includes applying a greater weight to each validated completed task relative to a correlated unvalidated completed task for a different property;

determine a relative ranking of the subject property to the first other property and the second other property based on the analysis;

adjust the relative ranking based on a scale associated with other comparative properties; and provide the relative ranking for the subject property, the relative ranking based, in part, on the HomeScore reflecting a relative maintenance grade for the subject property.

16. The cloud-based computer system of claim 15, wherein the instructions to cause the one or more computer processors to analyze the first, second, and third set of metrics include instructions to cause the one or more computer processors to determine adherence to a prescribed list of maintenance tasks and timely completion of each task from the prescribed list.

17. The cloud-based computer system of claim 16, wherein adherence includes providing a greater weight to validated completed tasks over unvalidated completed tasks.

* * * * *